(12) United States Patent
Blanc et al.

(10) Patent No.: US 9,164,807 B2
(45) Date of Patent: Oct. 20, 2015

(54) STATICALLY ALLOCATING SET OF TASKS TO PARTICULAR CLUSTER AND DYNAMICALLY ALLOCATING EACH TASK TO DIFFERENT PROCESSING UNITS WITHIN CLUSTER

(75) Inventors: Frédéric Blanc, Bures sur Yvette (FR);
Thierry Collette, Palaiseau (FR);
Raphaël David, Bures sur Yvette (FR);
Vincent David, Marcoussis (FR);
Michel Harrand, Saint-Egreve (FR);
Stéphane Louise, Orsay (FR); Nicolas Ventroux, Bures sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1433 days.

(21) Appl. No.: 12/747,715

(22) PCT Filed: Dec. 11, 2008

(86) PCT No.: PCT/EP2008/067345
§ 371 (c)(1),
(2), (4) Date: Dec. 28, 2010

(87) PCT Pub. No.: WO2009/077429
PCT Pub. Date: Jun. 25, 2009

(65) Prior Publication Data
US 2011/0093854 A1  Apr. 21, 2011

(30) Foreign Application Priority Data
Dec. 14, 2007 (FR) ...................................... 07 08740

(51) Int. Cl.
*G06F 9/46* (2006.01)
*G06F 9/50* (2006.01)

(52) U.S. Cl.
CPC .................................... *G06F 9/5066* (2013.01)

(58) Field of Classification Search
CPC ....................................................... G06F 9/5066
See application file for complete search history.

(56) References Cited

U.S. PATENT DOCUMENTS 6,467,075 B1 * 10/2002 Sato et al. ..................... 716/103
(Continued)

FOREIGN PATENT DOCUMENTS

EP  1043658  10/2000

OTHER PUBLICATIONS

International Preliminary Report on Patentability and International Search Report dated Apr. 6, 2009, issued in counterpart International Application No. PCT/EP2008/067345.
Ewerson Carvalho et al: "Heuristics for Dynamic Task Mapping in NoC-based Heterogenous MPSoCs", Rapid System Phototyping, 18th IEEE, May 1, 2007, pp. 34-40.
(Continued)

*Primary Examiner* — Meng An
*Assistant Examiner* — James J Lee
(74) *Attorney, Agent, or Firm* — Stroock & Stroock & Lavan LLP

(57) ABSTRACT

A system including a plurality of processing units for executing tasks in parallel and a communication network. The processing units are organized into clusters of units, each cluster comprising a local memory. The system includes means for statically allocating tasks to each cluster of units, so that a task of an application is processed by the same cluster of units from one execution to another. Each cluster includes cluster management means for allocating tasks to each of its processing units and space in the local memory for executing them, so that a given task of an application may not be processed by the same processing unit from one execution to another. The cluster management means includes means for managing the tasks, means for managing the processing units, means for managing the local memory and means for managing the communications involving its processing units. The management means operate simultaneously and cooperatively.

25 Claims, 13 Drawing Sheets

(56) References Cited

U.S. PATENT DOCUMENTS

| | | | |
|---|---|---|---|
| 6,993,762 B1* | 1/2006 | Pierre | 718/102 |
| 7,676,788 B1* | 3/2010 | Ousterhout et al. | 717/106 |
| 8,028,292 B2* | 9/2011 | Inoue et al. | 718/105 |
| 2005/0188191 A1* | 8/2005 | Yoshida et al. | 713/1 |
| 2005/0251567 A1 | 11/2005 | Ballew | |
| 2006/0274973 A1* | 12/2006 | Mohamed et al. | 382/281 |
| 2007/0189163 A1* | 8/2007 | Ozawa | 370/230 |
| 2008/0052712 A1* | 2/2008 | Gustafson et al. | 718/101 |
| 2009/0031312 A1* | 1/2009 | Mausolf et al. | 718/102 |

OTHER PUBLICATIONS

N. Ventroux: "Controle en ligne des systèrnes multiprocesseaurs hétérogènes embarqués: élaboration et validation d'une architecture" THESE, [Online] Sep. 19, 2006, pp. 1-192.

Ligang He et al.: "Performance Evaluation of Scheduling Applications with DAG Topologies on . . . ", Parallel and Distributed Processing Symposium, Apr. 25, 2006, pp. 1-8.

Stankovic J A et al.: "The Spring Kernel: A New Paradigm for Real-Time Operating Systems*" Operating Systems Review, vol. 23, No. 3, Jul. 1, 1989, entire document.

* cited by examiner

STATICALLY ALLOCATING SET OF TASKS TO PARTICULAR CLUSTER AND DYNAMICALLY ALLOCATING EACH TASK TO DIFFERENT PROCESSING UNITS WITHIN CLUSTER

CROSS REFERENCE TO RELATED APPLICATIONS

This application is the U.S. National Phase application under 35 U.S.C. §371 of International Application No. PCT/EP2008/067345, filed Dec. 11, 2008, and claims the benefit of French Patent Application No. 0708740, filed Dec. 14, 2007, all of which are incorporated by reference herein. The International Application was published on Jun. 25, 2009 as WO 2009/077429.

FIELD

The present invention relates to a system comprising a plurality of processing units making it possible to execute tasks in parallel in an efficient and effective manner. It applies for example in all fields requiring intensive computations with efficiency and consumption constraints related to embedded systems.

BACKGROUND

The semi-conductor industry is facing a disconcerting circumstance: there are no longer any credible routes for significantly increasing the performance of processors, at least not at the individual level. Only systems using several processors operating in parallel still seem to constitute an encouraging route for increasing the computational power of systems. Indeed, studies conducted in the 1960s have shown that the ratio of computational power to efficiency of computational systems is potentially much higher for parallel systems than for sequential systems. The question can then arise of knowing why parallel systems did not become prevalent sooner, especially in the field of embedded systems which are basically highly centered on optimization and efficiency. On the one hand, the technology did not allow the integration of massively parallel structures on one and the same component, with the exception of SIMD ("Single Instruction, Multiple Data") structures which are easily programmable when the application is tailored to this type of parallelism. On the other hand, generally, parallel systems are much more difficult to program and to develop. Such is the case notably for symmetric systems, also called homogeneous systems, based on the replication of the same processing element and possessing identical and homogeneous access and communication interfaces. Such is less the case, however, for asymmetric systems, also called heterogeneous systems, which use several specialized processors for processing operations and particular interfaces. Asymmetric systems have been prevalent for a long time, for example for conventional peripherals of the video or network chip type, but they nevertheless remain limited as regards the number of processors placed in parallel. It should be noted that, generally, this prevalence has occurred in application fields that are not very complex at the processing control level, that is to say in which the heterogeneity of the resources limits not only the complexity of the mapping of the processing operations but also the flexibility of the mapping of the processing operations. However, specialized multiprocessing systems have also appeared in embedded systems. In the field of mobile telephony, "multicores" on a single chip have appeared which can contain DSPs ("Digital Signal Processors") for signal processing, GPUs ("General Purpose Processing Units") for ordinary processing operations, as well as analog input/ouput blocks. In the field of personal stereos or multimedia players, decoding cores dedicated to audio ("MPEG Audio Layer", "Dolby D", "DTS") or to video ("MPEG", "H264") have appeared in addition to the general-purpose processor. Symmetric parallel systems are for their part less developed, notably because of the difficulty in handling the programming and because of the inextricability of the fine tuning of the programs. Generally, these difficulties of programming and fine tuning are exacerbated by the ever increasing complexity of the applications. In embedded systems, these difficulties are also exacerbated by the desire to integrate ever more functionalities and by the continual increase in the volumes of data to be processed. For example, mobile telephones associate telecommunication functions with multimedia functions, positioning functions, or else games. Mobile telephones use video sensors of ever greater capacity and converters of ever higher throughput. Moreover, intensive-computation tasks run alongside tasks dominated by control, with very strong interactions between these various elements of the applications.

The invention relates more particularly to the field of embedded systems offering high computational power. New applications in fields such as multimedia, communication, or real-time processing systems demand ever more computational power for controlled surface areas and levels of power consumed. As already explained previously, short of being able to increase the processing powers of the computational elements in an isolated manner, the only realistic solution is to multiply the computational elements and to operate them in parallel. Within this framework, a new concept is currently making its appearance, that of the parallel system on chip. In theory, parallel systems on chip allow more efficient use to be made of the additional transistors that can be integrated on one and the same chip on account of advances in etching techniques. Even within the fairly specialized framework of processors for embedded systems, this trend to increase the number of execution cores on one and the same chip is very marked. In the medium term, this trend ought to mark the introduction or indeed the making prevalent of systems with several tens or indeed hundreds of execution elements. Among these systems may be cited multiprocessor systems on chip, usually designated by the acronym "MPSoC" standing for "Multi-Processor System on Chip". MPSoCs are complete systems which integrate as a minimum computational elements able to operate in parallel and a complete communication architecture on chip. The communication architecture of the current MPSoCs reproduces a connection system architecture for a system composed of several macroscopic elements. It can comprise communication buses, dedicated networks on chip, usually designated by the acronym "NoC" standing for "Network on Chip", dedicated interconnection switching systems, usually designated by the expression "crossbars", input/ouput interfaces, random access memory, usually designated by the acronym "RAM", local memories, cache memories or "scratchpads". But most of the time, the communication architecture of an MPSoC comprises a combination of all this. The essential problem of the mimicry of communication architectures on chip in relation to macroscopic architectures is that macroscopic architectures are envisaged for very regular processing operations, whether these be massively parallel computational processing operations, stream processing operations or server tasks. Now, applications on embedded systems are increasingly tending toward much less regular and much less predictable processing operations. The communication architecture of MPSoCs must therefore be rethought. Indeed, the implementation of efficient parallel systems on chip with high-level performance such as MPSoCs makes it necessary to operate tens or indeed hundreds of computational cores or processing elements in unison. If this is not the case, then the use of parallelism is not optimal. This implies that several tens or indeed several hundreds of processing elements are not used correctly, that is to say they have a rate of use that is not fairly high. Hereinafter, the processing elements will be designated by the acronym "PE" standing for "Processing Element". But to exploit parallelism in an optimal manner, the difficulties are multifold. At the software level, a difficulty is that of providing the programmer with simple and accessible tools for expressing in code the whole of the potential parallelism of an application. Another difficulty at the software level is the ability to derive the greatest benefit therefrom when compiling this code. But these very complex software problems are not the subject of this patent application.

To efficiently exploit a parallel architecture, it is necessary to tackle the problem under the three-fold aspect of the control of the indeterminism, of the control of the communications and of the control of the checks. Indeed, once a potential parallelism has been extracted from an application and expressed in a program, it must still be possible to actually implement this parallelism in a given hardware architecture. In an MPSoC for example, in order to derive the greatest benefit from the work of extracting the application parallelism done by the programmer, numerous processing sequences must be successfully distributed over all the resources of the chip, these sequences being inter-related by dependencies of data or of execution control. Hereinafter, these sequences will be called execution tasks. An execution task therefore relates to the execution of a processing operation on a PE. It is generally called a "thread" by software specialists. By default in the remainder of the present patent application, the term "task" alone refers to an execution task. Without any consideration pertaining on the one hand to the way of choosing the PEs and on the other hand to the way of operating them together, it is very improbable that the architecture can actually implement the whole of the parallelism expressed in the program. In some sense, in the same way as the program expresses the potential for parallelism of the application, it is necessary to find a means of expressing the potential for parallelism of the architecture through appropriate control of the tasks. The consideration must take into account all the situations which may be detrimental to good use of the potential parallelism of the architecture. This involves firstly the risks of being limited by the access to an essential shared resource such as the central memory, a network, a communication bus or a task manager. It also involves the risks of not being able to manage in a sufficiently precise manner the interdependencies between the tasks, or of not being able to manage them without tailoring to the particularly dynamic character of certain applications. Finally, it involves the risks of not being able to control the indeterminisms of the parallel execution, making it complex and tricky to fine tune the programs. The consideration must culminate in an execution model which defines the way of choosing the PEs and the way of operating them together. Making several tens or indeed several hundreds of PEs operate together in an efficient manner within one and the same chip is currently one of the major challenges which the microelectronic industry has to meet. At the present time, techniques for programming parallel applications are markedly more difficult to implement than techniques for programming sequential applications, both from the standpoint of the design and that of the fine tuning of the programs. In order to progress the parallel programming models toward better accessibility to the programmer, it is necessary for the execution model of the underlying parallel architecture to be properly tailored to this. This must however be done without thereby sacrificing the efficiency of implementation on current silicon technologies. This is one of the technical challenges which the present invention proposes to address.

For historical reasons, the exploitation of parallelism has hitherto endeavored to propose solutions making it possible to profit from parallelism at the application task level. Indeed, despite intense research around the definition of architectures capable of efficiently managing a high degree of parallelism at the instruction level, these approaches have rapidly shown their limits. At the same time, the complexity of embedded systems makes it extremely difficult or inefficient to model them in the form of a single control flow. Thus, users and architecture designers concur in favoring parallelism at the task level. Consequently, a strong trend currently observed in the field of embedded systems is the integration on one and the same silicon substrate of several processor cores allowing the execution of tasks in parallel on one and the same circuit. Several solutions have already been proposed for exploiting the parallelism of such architectures on one and the same silicon substrate. The best known models are the "SMT" model according to the acronym standing for "Simultaneous MultiThreading", the "CMP" model according to the acronym standing for "Chip MultiProcessing" and the "CMT" model according to the acronym standing for "Chip Multi-Threading". Hereinafter, the processing units capable of managing the execution of a set of instructions will be distinguished from the computational units capable only of executing one instruction.

But the SMT, CMP and CMT models only partially address the problem of embedded systems. They exhibit notably numerous drawbacks. Indeed, as will be detailed subsequently, these models do not make any distinction between the various processing classes that can coexist within an application. Constructed on non-optimized computational primitives, these systems are often unsuited to the applicational requirements in regard to electrical consumption, cost/performance ratio and operating dependability. These are major drawbacks.

Solutions of CMP type lead to a distinction being made between regular processing operations and irregular processing operations. This involves solutions implemented on architectures which integrate computational units dedicated to intensive processing operations, the irregular processing operations being handled with the system software on a general-purpose processor. But as will be detailed subsequently, the use of system buses gives rise to lower reactivity of the architecture and an inability of the system software to optimize the use of the computational units.

To attempt to minimize these drawbacks, American patent publication US2005/0149937A1, entitled "Accelerator for multiprocessing system and method", proposes that the mechanisms for synchronization between the computational units be handled by way of a dedicated structure. It does not however afford any solutions to the problem of data transfer between the tasks.

American patent publication US2004/0088519A1, entitled "Hyperprocessor", proposes for its part a solution to the management of task parallelism in the context of high performance processors. It does not however apply to embedded systems, notably for determinism and cost reasons.

SUMMARY

One aspect of the invention is to alleviate the aforesaid drawbacks. Since it is difficult to uniformly manage several hundred computational units in an individual manner, the present invention rather proposes hierarchized management of the tasks at two levels. The computational units being grouped into blocks of several units, the present invention proposes a mode of management of the tasks between the blocks and a mode of management of the tasks inside each block. Hereinafter, the blocks of computational units will be called "clusters". Within a given cluster, a very dynamic execution model allows local optimization of the use of the computational units, so that the processing of one and the same set of tasks in the cluster can vary from one execution to another. Between clusters, a more static execution model allows the allocation of tasks to a given cluster during compilation and during link editing, so that one and the same set of tasks is always processed by the same cluster from one execution to another. The communication tasks which ensure the routing of the information are also managed in a static manner during compilation and during link editing. In the case where the application of the two-level execution model according to the present invention leads to the situation whereby a task assigned to a given cluster has formally to use data generated by a remote cluster, the execution of said task is done on the same model as if it used only data of the local cluster. This is possible by virtue of communication tasks of "DMA" type according to the expression standing for "Direct Memory Access", which signal the availability or the transmission of the data from or to off-cluster destinations and handle the data transfer.

For this purpose, the subject of the invention is a system comprising a plurality of processing units allowing to execute tasks in parallel and a communication network. The processing units are organized into a plurality of clusters of units, each cluster comprising a local memory. The system comprises means for statically allocating tasks to each cluster of units, so that a given task of an application is processed by the same cluster of units from one execution to another of said application. Each cluster of units comprises cluster management means for dynamically allocating tasks to each of its processing units as well as some space in the local memory for executing them, so that a given task of an application may not be processed by the same processing unit from one execution to another of said application. The cluster management means comprise means for managing the tasks, means for managing the processing units, means for managing the local memory and means for managing the communications involving its processing units, these management means operating simultaneously and cooperatively.

Advantageously, the local memory that each cluster comprises can be dedicated to said cluster.

In one embodiment, the clusters of processing units can be disposed on a chip, the clusters of units communicating with one another by way of a network on chip. The system can also comprise a central memory.

The system can comprise means for compiling and editing links for statically allocating tasks to each cluster of units.

Advantageously, when a task allocated to a cluster of units has to consume data produced in another cluster of units, a data send task can be executed in the cluster where the data are produced, said send task being able to transmit the data to a data receive task executed in the cluster where the data are consumed, so that the task consuming the data can be executed on the same mode of dynamic allocation of the resources as if said task consumed only locally produced data. A memory space dedicated to the communication between the send task and the receive task can then be reserved in the local memory of one of the two clusters involved. Advantageously, the send task can be temporarily interrupted so as not to saturate the memory space dedicated to the communication between the send task and the receive task. The throughput of the send task can also be determined during compilation, so as to allocate to the receive task sufficient space in the local memory so that this space cannot be saturated.

For example, the data send and receive tasks can be allocated statically to the cluster where the data are produced and to the cluster where the data are consumed respectively. In one embodiment, the send and receive tasks can be executed by dedicated execution means exchanging data directly with the local memory of the cluster.

For example, the cluster where the data are consumed can dispatch a credit to the cluster producing the data as a function of the memory space still available, the cluster producing the data being able to adjust the data send throughput as a function of the credit received. When the memory space dedicated to the communication between the send task and the receive task is used beyond a given quota, the cluster management means for the cluster managing the receive task can also dispatch an interrupt signal to the cluster management means for the cluster managing the send task, and then can dispatch a resume signal when the memory space is used below the quota.

In one embodiment, the means for managing the local memory can allocate spaces in the local memory with a fixed granularity level, so as not to fragment the addressing space formed by the local memory. In another embodiment, the means for managing the local memory can allocate spaces in the local memory with a variable granularity level.

In one embodiment, the means for managing the local memory can free the spaces in the local memory through the use of a counter indicating the number of tasks that may have to consume the data of these spaces. As soon as a task no longer needs to access a data item, the value of the counter is modified. Thus the value of the counter makes it possible to be able to identify whether any consuming tasks still remain. If this is not the case the memory space can then be freed.

In one embodiment, the means for managing the local memory can free the spaces in the local memory through the use of a list of the tasks that may consume the data of these spaces. The means for managing the local memory then await an information item according to which none of the tasks of the list needs the data item any longer in order to free the associated memory space.

For example, the means for managing the tasks can comprise a module for selecting the tasks for determining the allocatable tasks fulfilling execution prerequisites and a scheduling module for assigning the allocatable tasks to the processing units. Advantageously, the module for selecting the tasks can determine the allocatable tasks fulfilling the execution prerequisites at one and the same time in a mode of execution of parallel multitask type and in a mode of execution of data flow type. The execution prerequisites can comprise precedencies of processing operations and/or availabilities of data and/or availabilities of memory spaces for storing the data produced and/or events that are local or external to the cluster.

Advantageously, the send task can allow to transmit data to several clusters of units simultaneously, so as to simultaneously supply several consuming tasks with the same data. Several send tasks can also be executed simultaneously in one and the same cluster of units, so as to simultaneously supply several consuming tasks with different data.

In one embodiment, the system can comprise means dedicated to the management of send and receive tasks of DMA type, so as not to overload the means for managing the tasks. The system can also comprise at least one inputs/outputs interface.

The system can for example allow to execute a morphing application by executing tasks in parallel on its processing units. It can also allow to execute an application implementing a Hough transform by executing tasks in parallel on its processing units. It can also allow to execute an MPEG decoding application by executing tasks in pipeline mode.

For example, the spaces in the local memory can be freed by using a counter of the number of tasks that have consumed the data of these spaces or by using a list of the tasks that have consumed the data of these spaces.

Embodiments of the invention have advantages of allowing parallel and concurrent execution of tasks on a platform comprising a plurality of PEs, in modes of execution of both control type and also data flow type, or which mixes the two modes. Thus, embodiments of the invention can be used within the framework of embedded systems.

BRIEF DESCRIPTION OF THE DRAWINGS

Other characteristics and advantages of the invention will become apparent with the aid of the description which follows offered in relation to appended drawings which represent.

DETAILED DESCRIPTION

The implementation of a large processing capacity is an emerging need of applications at the embedded systems level. Ever more high level decision taking needs to be based on low and medium level information processing tasks. A conventional example could be the detection of road signs for aiding the driving of vehicles. For such an application, low level processing operations must first of all normalize the brightness and the contrast of the image, and then carry out extraction of contours with a Sobel filtering for example. This is followed by medium level processing operations such as Hough transforms or recognitions of basic shapes. Finally, complex shape recognition or correlation processing operations, in conjunction with databases stored in memory, are applied at the highest levels. These high level processing operations can potentially be coupled with low level intermediate phases, such as for example a parallax correction. Vice versa, computationally intense low level processing operations can be directed by external data or data arising from previous processing operations. Such is notably the case for the latest generation video compression algorithms. As already indicated previously, a strong trend currently observed in the field of embedded systems is the integration on one and the same silicon substrate of several PEs allowing the execution of all these processing operations in parallel on one and the same circuit, notably by virtue of SMT, CMP or CMT models.

Figure 1:
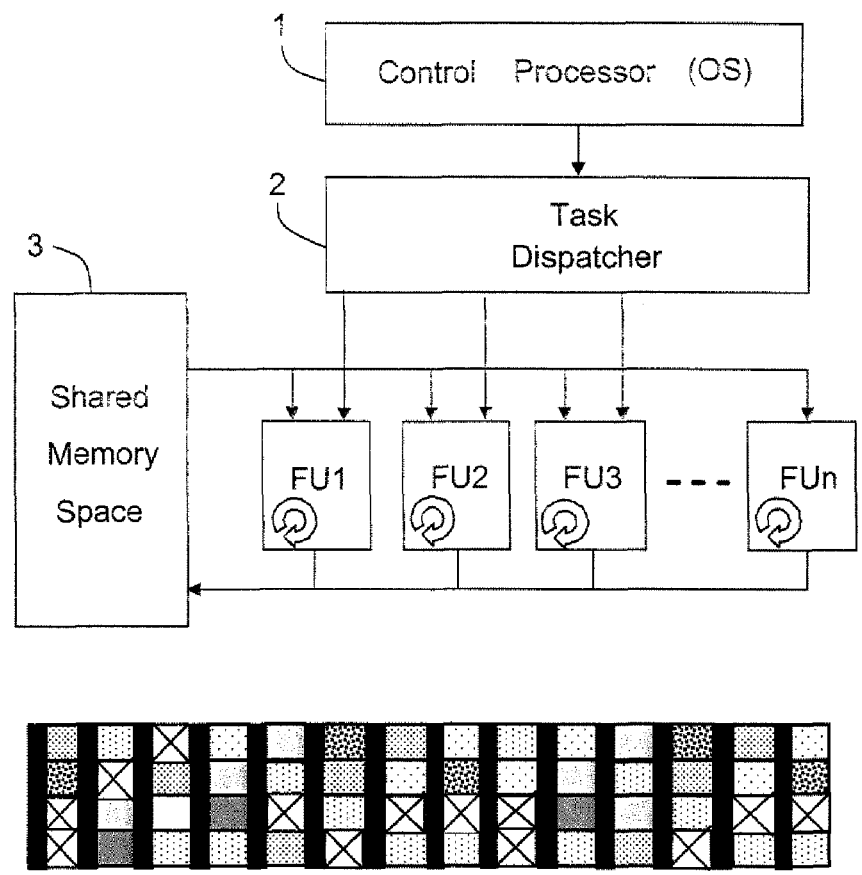
FIG. 1, through a chart, a generic model of SMT architecture and an operating example.

FIG. 1 illustrates through a chart a generic SMT model according to the prior art, as well as an operating example of this model. The chart at the top of the figure illustrates a piece of system software 1, or "OS" according to the expression standing for "Operating system", which supplies processing operations to a single control resource 2, or "Task Dispatcher" as it is known in the art. The control resource 2 redistributes the processing operations to n computational units FU1 to FUn, according to the acronym "FU" standing for "Functional Unit", only the units FU1, FU2, FU3 and FUn being illustrated by FIG. 1. At each cycle, the control resource 2 concurrently assigns instructions to the units FU1 to FUn according to the availability of the data coming from a central memory 3 shared by the units and according to possible random vagaries of operation. In the diagram at the bottom of FIG. 1, each square represents an instruction. A row of squares represents from left to right the instructions executed in chronological order by a unit. From top to bottom, the rows of squares represent the instructions executed by the units FU1, FU2, FU3 and FUn respectively. A task consists of a series of instructions represented by squares of the same texture. The black dashes between the instructions represent instruction assignment and control tasks. The crossed-out squares correspond to time intervals not used by the units, because of dependencies of data or resources for example. This first solution is for example implemented in the latest generations of "Intel" (trademark), "IBM" (trademark) or "HP Alpha" (trademark) processors. It consists in using several program counters, so as to feed the computational units with instructions arising from several flows of instructions. The dependencies between tasks being limited, the parallelism at the instruction level seen by the processor, or "ILP" according to the instruction standing for "Instruction Level Parallelism", is increased, as consequently is the performance of the processor. The implementation of these solutions is a tricky exercise, the complexity of the stages of reading and distributing the instructions being very high. Consequently, these architectures lead to very big circuits expending more than 100 watts per component, this being incompatible with the constraints of embedded systems.

Figure 2:
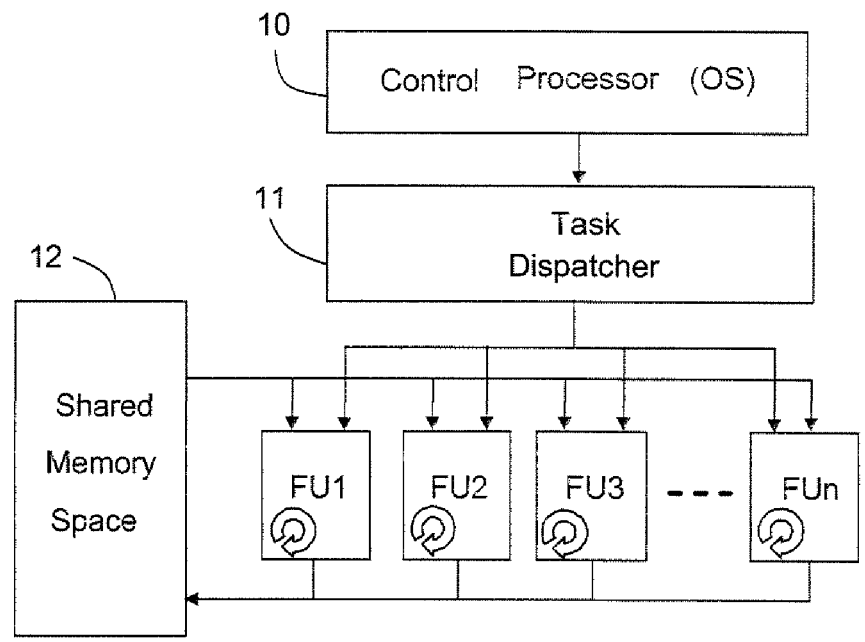
FIG. 2, through a chart, a generic model of CMP architecture and an operating example.
Figure 2:
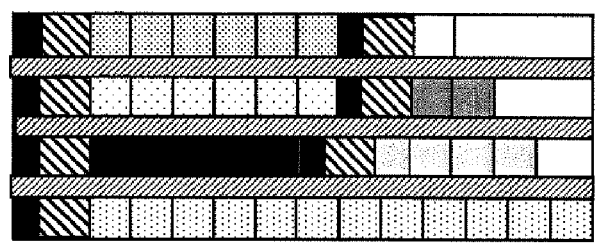

FIG. 2 illustrates through a chart a generic CMP model according to the prior art, as well as an operating example of this model. This solution is generally favored in embedded systems because of its relative simplicity of implementation. The chart at the top of the figure illustrates a piece of system software 10 which supplies processing operations to a single control resource 11. The control resource 11 redistributes the processing operations to the n computational units FU1 to FUn, only the units FU1, FU2, FU3 and FUn being illustrated by FIG. 2. The control resource 11 is charged with determining the tasks that are ready to be executed. As soon as a unit from among FU1 to FUn is freed, it is assigned a task which is processed as soon as the loading of the data from a central memory 12 ends. In the diagram at the bottom of FIG. 2, each square represents an instruction. A row of squares represents from left to right the instructions executed in chronological order by a unit. From top to bottom, the rows of squares represent the instructions executed by the units FU1, FU2, FU3 and FUn respectively. A task consists of a series of instructions represented by squares of the same texture. The black dashes between the instructions represent instruction assignment and control tasks. The loading of the data is represented by crossed-out areas. The principle of this solution is to concurrently distribute tasks to the units in accordance with their availability, and no longer instructions. Each unit then executes the tasks which are assigned to it, one after another and until their terminations. These architectures are split into two families: symmetric structures and asymmetric structures. The asymmetric structures integrate heterogeneous computational units FU1 to FUn optimized for a given application field, the distributing of the tasks over these resources being previously identified at the time of compilation. The software partitioning carried out during compilation thus makes it possible to simplify the mechanisms of dynamic distribution of tasks at the time of execution. Included among these so-called "application driven" solutions are notably the platforms from "OMAP" (trademark), "VIPER" (trademark), "PNX" (trademark) or "Nomadik" (trademark). For their part, symmetric structures are based on the integration of identical computational units FU1 to FUn. The units FU1 to FUn can be general-purpose, as in the Cells platform from IBM or MPCore platform from "ARM" (trademark), or optimized for a given application field, like the CT3400 from Craddle Technologies, optimized for MPEG4-AVC coding/decoding. Symmetric solutions make it possible to target very wide ranges of problems, whereas asymmetric solutions are optimized for a well identified application field.

Figure 3:
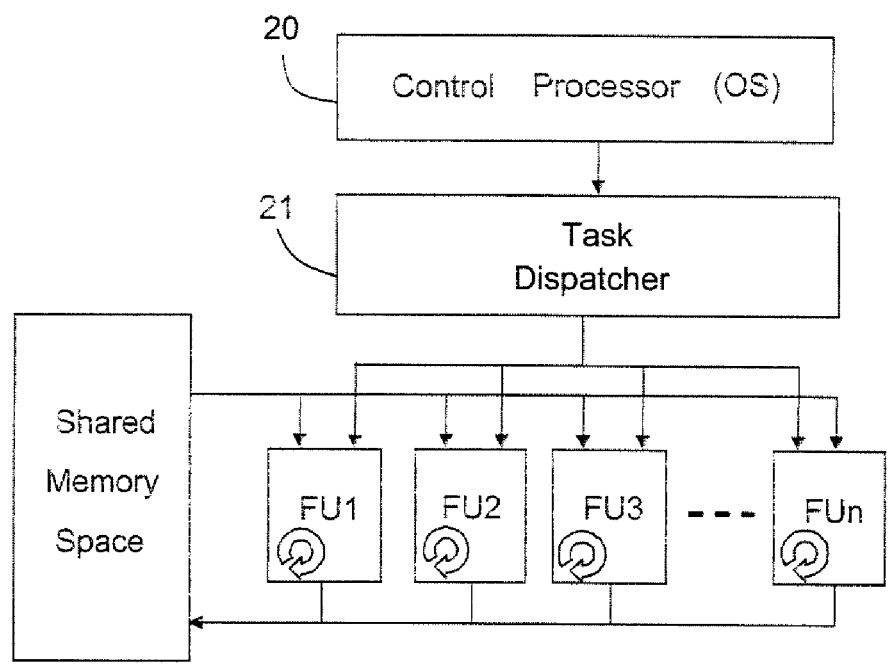
FIG. 3, through a chart, a generic model of CMT architecture and an operating example.
Figure 3:
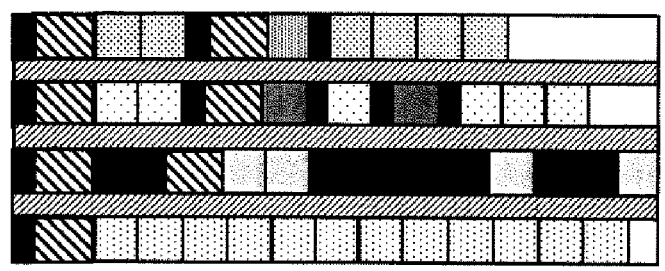

FIG. 3 illustrates through a chart a generic CMT model according to the prior art, as well as an operating example of this model. The chart at the top of the figure illustrates a piece of system software 20 which supplies with processing operations a single control resource 21. The control resource 21 redistributes the processing operations to the n computational units FU1 to FUn, only the units FU1, FU2, FU3 and FUn being illustrated by FIG. 3. The control resource 21 is charged with determining the tasks that are ready to be executed. As soon as a computational unit FU1 to FUn is freed, it is assigned a task, which is processed as soon as the loading of the data has been carried out. In the diagram at the bottom of FIG. 3, each square represents an instruction. A row of squares represents from left to right the instructions executed in chronological order by a unit. From top to bottom, the rows of squares represent the instructions executed by the units FU1, FU2, FU3 and FUn respectively. A task consists of a series of instructions represented by squares of the same texture. The black dashes between the instructions represent instruction assignment and control tasks. The loading of the data is represented by crossed-out areas. Each unit can manage several tasks concurrently. As soon as a task is disabled, for example because of a cache memory defect, the unit replaces it with a new one. In this case, the task switching within the unit does not result in any context loading penalties. This solution associates the previous two models SMT and CMP. Here, this involves extending the concept of CMP so as to permit the execution of several tasks on the units. For the moment it is envisaged only within the framework of solutions of server type. In particular, the future generations of servers from "SUN" (trademark) will exploit this technology, first of all with the UltraSparc IV and then with the Niagara processor.

As already stated previously, the SMT, CMP and CMT models illustrated by FIGS. 1, 2 and 3 only partially address the problem of embedded systems. Indeed, these models do not make any distinction between the various processing classes able to coexist within an application. Thus, processing operations that are strongly dominated by control are processed in an equivalent manner, that is to say on one and the same PE, as the processing operations that are regular and critical from the point of view of the execution time thereof. The computational units having to support the regular processing operations as well as the very irregular processing operations, this results in systems constructed on non-optimized computational primitives. Thus, the systems constructed on these prior art models are often unsuited to the applicational requirements in regard to electrical consumption, cost/performance ratio and operating dependability. It is however necessary to mention a few existing solutions of CMP type which lead to a distinction being made between regular processing operations and irregular processing operations. These involve solutions implemented on architectures which integrate computational units dedicated to intensive processing operations. The irregular processing operations are handled with the system software on a general-purpose processor. But though the integration of computational units dedicated to intensive processing operations permits optimizations allowing appreciable improvements to the performance or energy efficiency of these architectures, the inefficiency of the communications between the elements of the architecture unfortunately causes all the benefit of these optimizations to be lost. Indeed, the processing tasks must communicate with one another, they must also communicate with the system software and the control processing operations. In these systems, the communications are done by way of system buses, entailing large penalties both at the latency level and the bandwidth level. Thus, these systems are penalized by the latency accompanying the transmission of control information and by the throughput disturbing the data transfers. This results in a lower reactivity of the architecture and in an inability of the system software to optimize the use of the computational units. It is clearly apparent that the prior art does not provide any solution which addresses the problem of embedded systems as a whole. Notably, the aspects related to the high density of computational elements, which poses problems of access to the data, and to the indeterminism of execution, especially during access to shared resources.

Indeed, a data access problem arises when there is a very high density of computational units. If a great many units are present, this implies that at each instant, a great many data are necessary to supply all these units in such a way that the potential parallelism is actually implemented. However, access to the external DRAM is necessarily limited, most often by way of a single exchange bus. Consequently, it is impossible for all the computational units to be supplied on the basis of this DRAM, knowing that one exchange bus is rarely even sufficient to correctly supply a single computational unit. This is due to the differences in performance between the dynamic memories and the computational units, which had moreover given rise to the introduction of cache memories for processors right from the 1980s. This is the reason why it is unthinkable not to have any memory on chip on these highly parallel architectures. Access to the external memory being a limiting factor, it is necessary to be capable, during processing, of exploiting the data already present on the memory of the chip. These data originate either from the external memory, so they have been repatriated beforehand by a different processing, or they have been produced locally by a processing so as to supply new processing operations. This implies that strong pressure is applied to the communication interfaces in order to supply all these PEs. Stated otherwise, with a centralized memory on chip the bottleneck is situated at the level of the access to this centralized memory. With a distributed memory, the bottleneck is situated at the level of the communication interface. An interface capable of maintaining a high connectivity in respect of the communications between computational units is therefore necessary. There is therefore an antagonism between the connectivity of the communication which is a possible bottleneck of the parallelism if it is insufficient and a high risk of drastically reducing the silicon efficiency and energy efficiency if the communication interfaces are overdimensioned. Finally, the control of so many PEs also constitutes a problem. Since, if the control is centralized for all the units, the single control module constitutes a single point of synchronization, which has every chance of being a limiting factor in the exploitation of parallelism during execution. On the other hand, the independent control of several tens or hundreds of PEs by themselves is at the least tricky. Indeed, a relevant decision that has to be taken in regard to the scheduling of the tasks requires a knowledge of the states of the upstream processing operations. These processing operations executing on potentially distant PEs, this constitutes yet an additional load for the communication system. Thus, except for very regular processing operations with static scheduling such as the processing of data streams, this architecture with no execution control is not efficient. Moreover such an architecture would make it difficult to fine tune the programs on account of its non-deterministic behavior. To summarize, neither a completely distributed architecture, nor a highly unified architecture make it possible to obtain performance and efficiencies that are satisfactory at the execution level, except for an application which would be either trivially parallel or strictly data flow. As soon as an application needs control at any level, then it is necessary to envisage finding an intermediate equilibrium between these two extremes. But this also involves finding an equilibrium between static control and dynamic control.

Moreover, a major problem of parallel programming is the control of the indeterminisms, in particular in accesses to common resources such as storage or communication. The multiplicity of possible behaviors when random vagaries of execution and latencies are taken into account is much more complex than those which govern a sequential program. In practice this makes it potentially very difficult or indeed impossible to fine tune and consequently to program such systems. The risks are multifold: concurrences of access, inter-lockups, diverse inconsistencies. In a general parallel system it is in practice impossible to properly define an observable state of the system and consequently to know the reasons why an output behavior has been observed at a given instant. Even by playing back the same data in the same order and with comparable synchronizations, the same output behavior may not be observed because of the various random vagaries of the system. The absolute control of everything that happens in the system at each instant is of course not the sought-after response, since this would run the risk of greatly reducing the performance of the system by imposing, for example, a certain number of strong synchronizations between various elements. In fact the objective that must be sought is to obtain execution which is reasonably independent of the random vagaries of execution. This is indeed what is meant when one speaks of execution determinism. Since the risks in relation to an execution with uncontrolled indeterminism are numerous. Firstly, the lack of control of the communications gives rise to poor feeding of the input data, this being detrimental to parallelism. The lack of control of the communications is also detrimental to the control of the arrival of the data. If the communications are no longer deterministic, there is no longer any means of verifying that a particular data item reaches its destination when the communication network is highly loaded or when inter-lockups exist. The absence of data location due to the absence of determinism of the communication times does not make it possible to define a global state of the system, except for simplistic applications of the pure data flow type. It is then impossible to do fine tuning and execution control. Thereafter, the lack of control of execution gives rise to problems due to conflicts of access to the shared resources and problems due to poor account being taken of the chaining together of the processing operations. Without a control of execution, it is not possible to ascertain the behavior of a faulty program. Execution faults detected too late give rise to a phenomenon of propagation along the parallel execution chain, thereby making it increasingly difficult to determine the original cause. Finally, the determinism of execution makes it possible to control what happens in the execution of a given application on the chip. It makes it possible to envisage means for fine tuning programs and for tracing errors, these means making it possible to highlight errors right from the design of the applications. Such means render the hard points of parallel programming more accessible. This is one of the objectives of the present invention.

Figure 4:
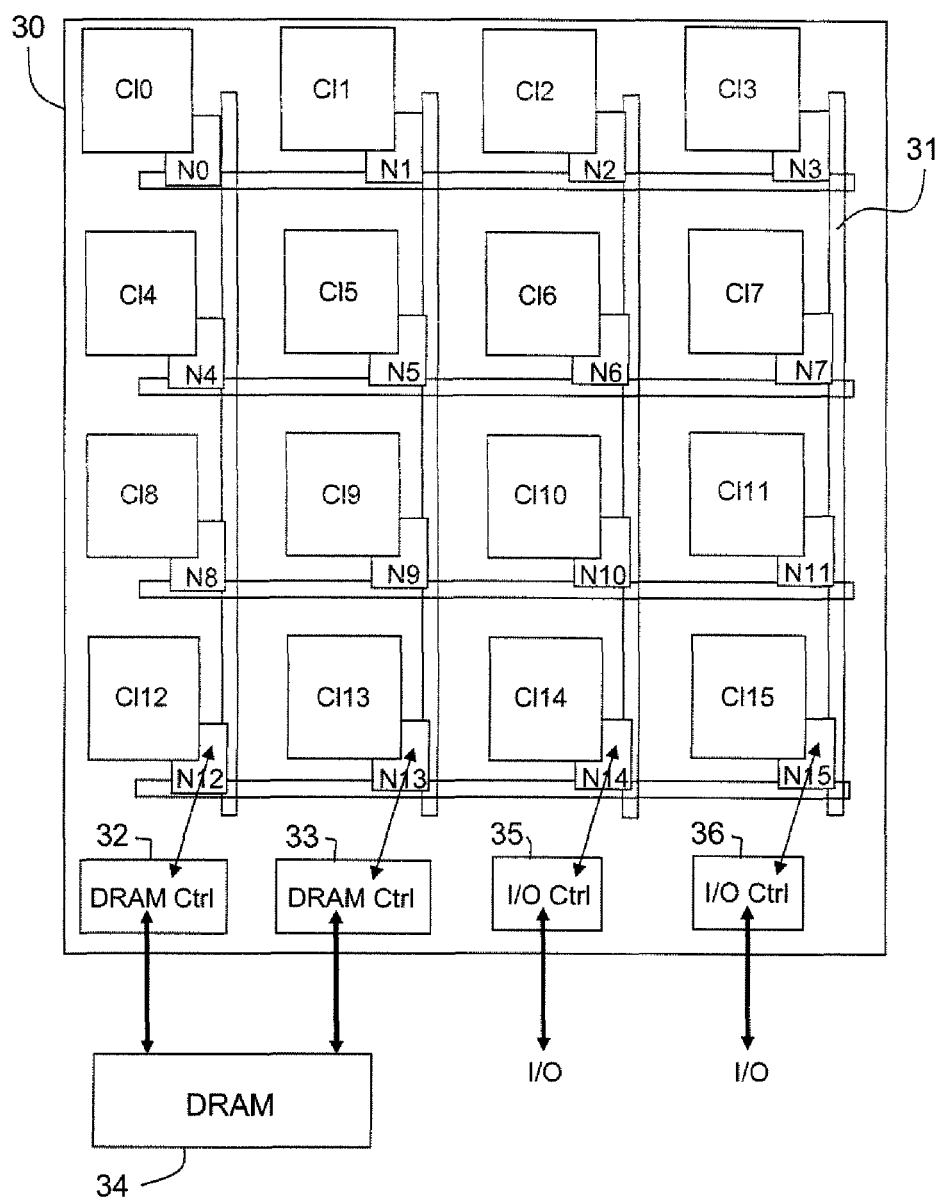
FIG. 4, through a diagram, an exemplary architecture comprising several clusters according to the invention.

FIG. 4 illustrates an exemplary general architecture according to the invention. In this example, 16 clusters Cl0 to Cl15 are disposed on a chip 30. Each cluster among Cl0 to Cl15 encompasses a certain number of computational units. These units are not represented in FIG. 4. They will be illustrated in greater detail in FIG. 5. The clusters Cl0 to Cl15 can communicate with one another by way of a communication structure disposed on the chip 30. For example, the communication structure can be a network on chip 31 or "NoC" to use the acronym. But extremely varied communication structures can be used, such as a bus, hierarchical buses or point-to-point structures. Hereinafter in the present patent application the use of the NoC 31 is the preferential solution only for reasons of performance and ease of illustration. Each cluster of Cl0 to Cl15 has an interface with the NoC denoted N0 to N15 respectively. Moreover, an architecture with beneficial topological properties can make it possible to greatly simplify the efficiency of the heuristics for mapping the tasks and for routing the communications. Indeed, mapping-routing constitutes a very complex problem in distributed systems. It can be NP-complete. Fortunately, there exist known heuristics providing approximate solutions. Of diverse complexities, these heuristics are however very sensitive to the topology of the support. Thus, in a preferential manner, a topology of toric type is adopted in the present example. But any other topology could be used without calling into question the invention described in the present patent application. It is then only a matter of finding a good compromise between the complexity of the network and that of the mapping-routing. For example, controllers 32 and 33 allowing access to an external central memory 34 of DRAM type and input/ouput controllers 35 and 36 break a priori the regularity of the torus. But as long as the clusters Cl0 to Cl15 are mutually identical, the mapping-routing problem can be considered independently of the accesses to the memory and inputs/outputs. Thus a first step can allow the mapping of the processing operations and the routing of the communications between the clusters. A second step can make it possible to optimize these accesses a posteriori, by exploiting the translation-invariance properties of a toric architecture.

Figure 5:
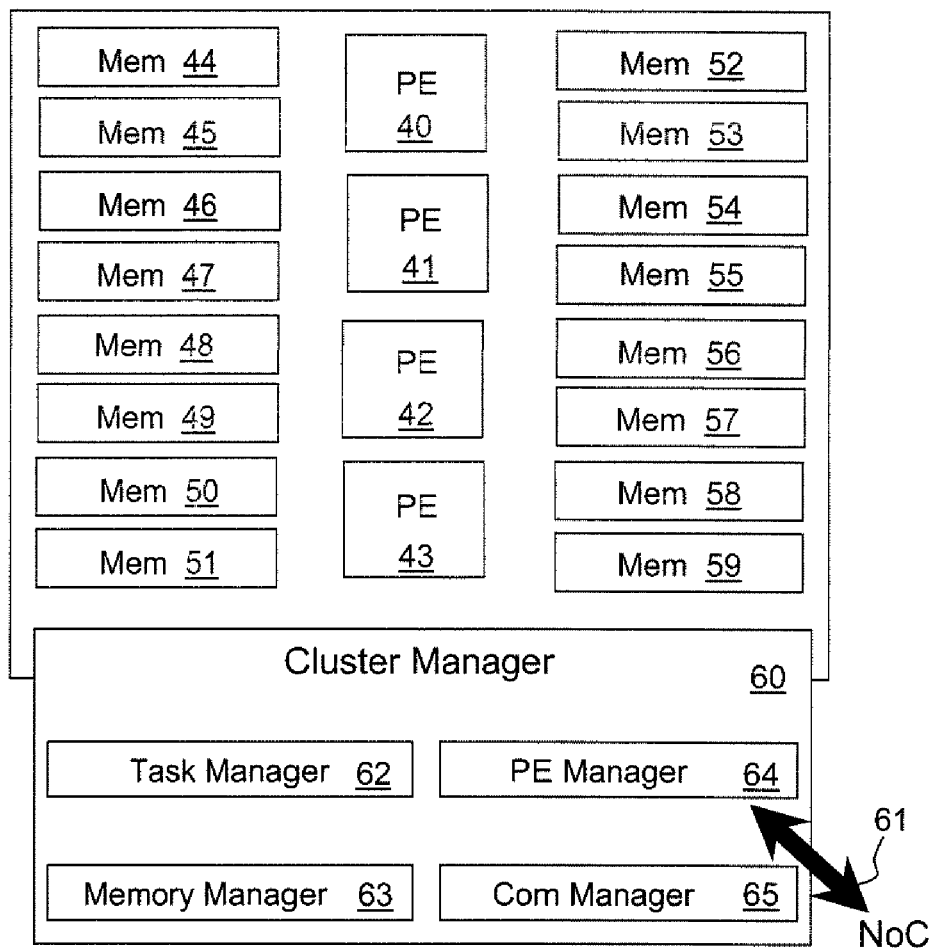
FIG. 5, through a diagram, an exemplary architecture of a cluster according to the invention and its operating principle.

FIG. 5 illustrates an exemplary internal architecture of a cluster from among Cl0 to Cl15, for example the cluster Cl0. The cluster Cl0 comprises for example four programmable PEs 40, 41, 42 and 43. For example, the units 40, 41, 42 and 43 can be processors, "Digital Signal Processors" or "DSPs", or else reconfigurable elements. The cluster Cl0 comprises for example 16 memory banks 44, 45, 46, 47, 48, 49, 50, 51, 52, 53, 54, 55, 56, 57, 58 and 59. The set of these banks constitutes in this example the local memory of the cluster, this local memory being able advantageously to be physically dedicated to the cluster. A module 60 for managing the cluster Cl0 makes it possible, among other things, to configure an interconnection resource internal to the cluster Cl0, so as to connect the memory banks 44 to 59 with the units 40, 41, 42 and 43 according to requirements. The interconnection resource is not represented in FIG. 5. Hereinafter the module 60 will be called the cluster manager. For example, a programmable DMA interface 61 is linked with the local node of the Noc 31. The DMA interface 61 makes it possible to advantageously transfer data between the memory local to the cluster Cl0 and the interface N0 of the cluster Cl0 to the Noc 31.

The cluster manager 60 is itself composed of several sub-modules operating simultaneously and cooperatively. According to the technological and cost constraints, these sub-modules can be produced at various levels of entanglement between hardware modules and software modules.

For example, the cluster manager 60 comprises a task management module 62 or task manager. The implementation to be preferred ought to be a programmable or reconfigurable solution relying on specific hardware resources, for example sorting structures or associative-storage structures. This makes it possible to optimize performance while having the necessary flexibility for tailoring the structure to the applicational constraints, in a similar manner to schedulers whose performance depends a great deal on the field of use.

For example, the cluster manager 60 also comprises a module 63 for managing the memory or memory manager, a module 64 for managing the units or PE manager, a module 65 for managing the network and communications or network/communication manager. The preferential implementation of these managers can be predominantly hardware-based so as to maximize performance. In all cases, the modules 62, 63, 64 and 65 can be invoked simultaneously. But it should be clearly understood that the splitting into sub-modules of the cluster manager 60 presented here does not presage any hardware or software structure supporting the functionalities of these sub-modules. Thus it is possible to hierarchize the functionalities so that they are brought close to the resources that they must manage, thus avoiding the formation of bottlenecks. Such an example will be detailed subsequently for efficient management of the data flow mode.

Upon initialization of the cluster Cl0 or during a forced reload, the task manager 62 and the network/communication manager 65 receive description tables containing the information which they need in order to operate. This initialization procedure can for example be managed by an external master distributing the initialization sequences by way of the internal network or by an internal procedure initializing each of the clusters Cl0 to Cl15 in sequence. On account of the frequent access to these tables by the managers 62 and 65, it is highly preferable that said tables be stored in internal particular memory spaces and not on the memory banks 44 to 59 of the cluster Cl0.

The managers 62, 63, 64 and 65 can receive various events originating from the cluster Cl0, such as events regarding the production or consumption of data on the part of the tasks executing on the units 40 to 43 or task termination events. In order to efficiently manage the memory resources, these managers can also receive events related to an overflow or to a risk of overflow of the allocated memory spaces. Likewise, these managers can request the dispatching of data which are in memory. This list of events is not exhaustive and any type of event potentially relevant for the execution and control of an application can be made available to these managers according to the applicational requirements.

A software task is the result of the splitting by the programmer of an application into processing operations on the basis of purely software considerations, for example taking account of the data dependencies. A software task does not result from any hardware consideration. By contrast, an execution task is related to the particular features of the hardware architecture and of the mapping-routing, as well as a multitude of other factors such as the scheduling of or the ability to interrupt processing operations. In the cluster Cl0 of FIG. 5, the task manager 62 is charged with managing the execution of the execution tasks on the units 40, 41, 42 and 43. For example, it can itself be composed of a module for selecting the tasks and of a scheduler, these two elements not being represented in the figure. For example, minimum prerequisites for launching the execution of a task can be provided in tables to the module for selecting the tasks upon system initialization. These may involve events that are local or external to the cluster. These prerequisites may then comprise not only precedencies between the tasks, but also availabilities of a minimum of data necessary for the start of the task or of memory spaces to store the data produced. Whether this be in a parallel multitask type mode of execution or in a data flow type mode of execution, when a given task is on standby and satisfies the minimum prerequisites, it is presumed to be allocatable by the module for selecting the tasks. The scheduler then chooses from among the allocatable tasks those which are elected to be executed on the PEs 40, 41, 42 and 43. It should be noted that the scheduling policy is highly dependent on the applications. For example, the scheduling policy for genuine real-time systems is radically different from the scheduling policy for "best effort" systems, as they are known in the art. Consequently, the scheduling policy is either programmable or reconfigurable according to the type of applications aimed at.

Moreover, if the minimum prerequisites are fulfilled, this implies that the task can be allocated to one of the units 40, 41, 42 or 43, that is to say it can begin to execute. But this does not necessarily imply that all the data are available. Thus, it is not certain that the execution of a task can be brought to its termination without internal synchronization phases which may be related to the availability of the data or of memory space. As detailed subsequently, these synchronizations internal to a task may be managed locally by the PE 40, 41, 42 or 43, or else may involve the task manager 62.

When a task is allocated to one of the units 40, 41, 42 or 43, the cluster manager 60 forwards the selected unit the parameters which it needs in order to initialize itself, which may be, for example, the current context if the task had been switched or inputs for its local address translation table. These tables, whose manner of operation will be detailed hereinafter in the patent application, allow the link to be made between the data such as arises from the programming and their physical addresses, available only during the execution of the task locally on a cluster. This table allows a task to access the data that it has to manipulate. The task operates in the most transparent possible manner in relation to the unit where it executes and to its upgrades, if any. The task can dispatch signals to the cluster manager 60 to indicate that it has finished a processing operation on data, whether this be by production or by consumption. The associated memory is either free for reallocation to another task, or the data that it contains may be useful as input to another task. If a task makes an invalid access to the memory which is provided to it by way of the memory allocation tables, this may stem from two situations. First of all, the task considered may be at fault and have to be stopped. Or else, the task may have started up although it did not yet have all the necessary data for input or all the necessary memory space for output. It should be noted that the latter situation also corresponds to the case of data flow type processing, which needs to be supplied with data continually, but whose efficient supply depends on the tempo of the input stream provided by previous processing operations. The memory space allocated to a task not being infinite, it may also happen that there is no longer the necessary room required to store the data produced, although the input stream is still available. These cases are not errors, but they may lead the task manager 62 to switch the processing if it has another task to be allocated on one of the units 40, 41, 42 or 43. This may depend on the number of processing operations and the chosen scheduling policy. If the data or the memory required for the execution of the processing operation become available, the cluster manager 60 can also transmit an update of the unit's address translation tables, so that said unit can continue the task in progress. The detection of errors during memory accesses is paramount in order to have secure operation and to allow efficient fine tuning of the applications. When reading, these errors represent access to a data item which is never available, as it was not produced. When writing, these errors represent access to a data item which exceeds the memory space allocatable to this task. The distinction between the case of a fault and the case of normal operation must be made by analyzing invalid accesses. An access range leading to the normal operating case and a second range leading to an erroneous case are defined off-line. It is also possible to use a "watch-dog", as it is known in the art, which makes it possible to identify tasks on standby awaiting data or memory space, whose behavior is abnormal in relation to the temporal behavior in the worst case. These tasks are then considered to be at fault. It is also possible to identify whether a task should exploit the data flow mode. In certain cases it will then be possible to detect an error rapidly, it not being possible for a non-data flow task to be on standby awaiting data.

In the exemplary embodiment of FIG. 4, the clusters Cl0 to Cl15 and the controllers 32 and 33 advantageously have execution means dedicated to the communication tasks, such as at least one DMA engine. The DMA engines can advantageously exchange data directly with the memory local to the cluster. These DMA engines can advantageously be used to execute communication tasks making it possible to exchange data among the clusters Cl0 to Cl15. This is why the communication tasks will subsequently be called "DMA tasks" hereinafter in the patent application. For example, a send task can be executed in the cluster where the data are produced and a receive task can be executed in the cluster where the data are consumed. Advantageously, these send and receive tasks can be allocated statically to the clusters in the same manner as the other tasks. In the present invention, the DMA engines are simply considered to be particular PEs. The DMA tasks are managed in the same manner as a processing task but require that the management means are constrained to use resources of DMA type to execute them. In normal operation, a DMA engine charged with the reception of data must have available a space in the memories 44 to 59 tailored to the quantities of data provided at reception. If data arrive although there is no longer any memory available, then this involves a major error that must be signaled to the cluster manager 60. To attempt to avoid this, a mechanism allows the cluster Cl0 in reception mode as illustrated by FIG. 5 to signal to a send cluster the problem of saturated communication link. In the example of FIG. 5, if the memory manager 63 does not succeed in assigning additional memory to the relevant communication link, then an interrupt signal can advantageously be dispatched to the send cluster. A second signal can be dispatched to it as soon as sufficient memory is available to perform the allocation. This mechanism makes it possible to be certain of the most transparent possible cooperation when the send streams from one cluster to another must be directed by the consumer.

When a data load has terminated, whether upgoing or downgoing, the corresponding DMA engine dispatches a signal to the cluster manager 60 to indicate this to it. This end of loading may occur in such a way that prerequisites regarding local allocation of tasks are then fulfilled. Thus, from the point of view of the data receive cluster Cl0, the inter-cluster communication mechanism is equivalent to the local production of data by one of the units 40, 41, 42 or 43. From the point of view of the cluster Cl0, this involves waiting for a task termination: either a task of producing data executed by one of the units 40, 41, 42 or 43 terminates, or a task of receiving data by a DMA engine terminates. This makes it possible to avoid differentiating an execution model for the processing operations manipulating local data and an execution model for the processing operations which use remote data. It is very important to be able to show that such a unit of the intra- and inter-cluster execution model actually exists. Indeed, it is this unit which makes it possible to envisage simplified generation of the codes, since it is unified. Consequently, a DMA task is managed in the same manner as an ordinary task by the task manager 62. It must however be further constrained by the external data flowing around the network of the chip. Notably, a DMA task must be a program generated specifically for the chosen communication channels, the allotted bandwidths and the arrangement of the data to be processed. According to the applicational requirements, the program of a DMA task can also be parametrized to ascertain all the information influencing the communication, which information cannot be predicted off-line. By way of example, a function of object tracking in an image requires the manipulation of image sub-parts whose size and position is obtained only after a low-level processing.

The memory manager 63 is charged with allotting the data contained in the memory banks 44, 45, 46, 47, 48, 49, 50, 51, 52, 53, 54, 55, 56, 57, 58 and 59 to the various execution tasks in the cluster Cl0. The memory manager 63 must operate in conjunction with the units 40, 41, 42 and 43 on which the tasks execute. For this purpose, it receives various events, either directly from the PEs which execute tasks, or by way of the task manager 62. This makes it possible to manage the access rights and the memory quotas of the tasks. In addition to the allotting of a memory space to each of the tasks executed on the units 40, 41, 42 and 43, the memory manager 63 also plays an important role during inter-cluster communications by managing the memory space associated with each communication channel. For example, the memory manager 63 can advantageously manage a quota, which is a memory size allocatable to a task for a data item. This quota has a direct application in respect of the processing operations for data flows, but its usefulness is not limited to this. Indeed, the exceeding of the quota may generate an event toward the task manager 62, which may make it possible to interrupt the generation of the data by communicating if appropriate with the task manager of the cluster where said data item is produced. A second event may be generated by the consumption processes when the data item passes back below its quota, and this may allow the resumption of the producer task. The term "quota" does not prejudge the room which is actually taken up by the data item, since the latency between the generation of the event and the suspension of the producer task may lead the data item to exceed this quota fleetingly. It is the responsibility of off-line dimensioning tools to increase the latencies and to compute the quotas accordingly. If these tools commit errors, it is simple to detect it. Either the dynamic allocations of memory on the cluster cause an overflow of the memory available on the cluster, thus generating a serious exception. Or the memory is under-used and the tasks placed on standby without justification, and this may be revealed with "profiling" tools, as they are known in the art.

In order to further specify the notion of quota, it is important to note that these apply to all the data dependencies, that is to say both inside a cluster and also between clusters, or even between a cluster and the central memory.

There are several ways of implementing quotas. In the present example, for reasons of optimizing the use of the memory, it is advantageous not to use separate memory buffers for the producer and for the consumer, except in the cases of communication between clusters. This implies that it is sufficient to allot quotas either with regard to the production of the data or with regard to the amount of data offered for consumption for a given task. In both cases, optimal control of execution makes it essential to know which is the producer-consumer pair of an over-quota data item. This pair is not necessarily unique for a particular data item, it is therefore necessary to be able to discriminate among the possible candidates. In this way, the task manager or the programmer, depending on the phase of development, is capable of detecting the exact origin of the random vagaries, so as to confine the random vagaries and to prevent normal operation of the other tasks from being directly undermined. Hereinafter in the text, a particular implementation of this identification of over-quota is shown by looking at the problem from the point of view of the data under consumption. The solving of this identification from the point of view of a quota on productions is a dual problem in the mathematical sense of the term.

This mechanism can nonetheless be implemented in a simplified manner, if we do not seek the maximum control of execution, merely specifying for each data item the number of potential consumers. It then suffices to decrement this value on each potential access in order to determine the number of remaining potential consumptions. It is however in this case impossible to determine, in the case where there are several consumers, which one is responsible for the lockup.

There are of course other ways of controlling the size of the streams during the communications, the important thing being to be able to detect data loss when the capacities of a communication channel are exceeded. Thus it is also possible to provide the producer with an information item about the memory room available on the communication channel. Advantageously, this solution can be implemented by credit-based mechanisms, which is done however at the price of a loss of consistency between the way in which the flow of the data operates inside the cluster and outside the cluster. The receiver cluster dispatches in this case to the cluster containing the producer credits corresponding to the memory size available. The dispatching of the data by the producer is then conditioned by the presence of sufficient credits.

The memory manager 63 receives several signals. For example, it can receive a signal indicating the end of exploitation of a memory block by a task. It then updates its allocation tables. If the block concerned is no longer used by any execution task, including by DMA tasks, then the manager frees the block for reuse. The memory manager 63 can also receive a signal indicating the allotting of a block to a task. For example, if a data block is produced by an execution task which does not itself consume the data, then the block is simply allotted to the various consuming tasks. The memory manager 63 must verify that this allotting does not cause any violation of memory quota for the consuming task in relation to this data item. The memory quotas are provided as constants to the memory manager 63 by mapping-routing tools. For each quota exceeded, an exception is reported to the task manager 62. After a quota has been exceeded at the level of a task, the memory manager 63 also dispatches a signal to the task manager 62 if the over-quota disappears at the level of the task in question, subsequent to a data consumption.

In the present patent application, a block denotes the smallest element managed by the memory manager 63. The size of a block can vary between the smallest addressable element in a memory bank 44 to 59 up to a complete memory bank. The coarser the granularity, the simpler the memory manager 63 is to program. But a coarse granularity brings about a very significant under-usage of the memory resources, this having consequences in terms of performance on the system as a whole. On the other hand, too fine a granularity renders the memory manager 63 extremely complex, and this may constitute a bottleneck for the system. There is therefore reason to find a good compromise regarding the granularity of the blocks. Moreover, it is possible in the execution model proposed by the present invention to have blocks of variable size. However, a preferential embodiment can consist in using a fixed block size, so as to adopt a homogeneous framework with good property in terms of determinism. Moreover, managing blocks of variable size makes it necessary to introduce a defragmentation function to keep the addressing space continuous.

Be it physical or virtual, it must be possible for the routing of the communications to be performed by off-line tools. This therefore involves static or static by phase routing. In order to guarantee maximum communication latencies and therefore deterministic execution of the application, a routing mechanism with guaranteed latency for the routings performed off-line is necessary. Several schemes make it possible to achieve this result, going from simple bandwidth reservation to much subtler variants such as "Time Division Multiple Access" or "TDMA", as it is known in the art. Note that certain communication networks accept fixed explicit routings, such as multi-bus networks or dedicated interconnection switching systems. The node of the NoC 31 local to the cluster Cl0 is associated with the DMA tasks charged with inputting or outputting the data of the cluster Cl0. Together with the DMA interface 61, it is the interface which tailors the DMA task to the protocol of the network formed by the NoC 31. On the other hand, the way the data are propagated between the nodes of the network does not impact the execution method, which endeavors to be equally well suited to networks of "packet-switch" type as to networks of "circuit-switch" type, as they are known in the art. The specification of the path to be traversed by the data must however be able to be distributed. In a network of "packet-switch" type, this involves parametrizing the communication paths in the data packets. A distributed configuration interface may make it possible to partially configure each node of the network traversed by a communication, the opening of a communication path having not to disturb an existing path. It should be noted that if the NoC 31 is replaced with a communication structure of the bus type, then this structure has no network node and consequently only an interface for tailoring and access to the bus is implemented in each cluster Cl0 to Cl15.

The aim of the DMA tasks is to ensure the data exchanges between the clusters Cl0 to Cl15. Thus, they are brought into play when the data production and consumption tasks are not on the same cluster. A processing task executing on the cluster Cl0 uses only data present in the banks of memories 44 to 59 in the cluster Cl0. It is therefore necessary to transfer data between the clusters Cl0 to Cl15 when tasks executed on remote clusters have data inter-dependencies. Thus, the send tasks do not create any data, but read data local to the cluster Cl0 so as to rewrite them to the memory space of another cluster. The DMA tasks may be more or less complex as a function of the hardware support at their disposal. Thus, the data access functions may be extremely basic, such as data access in "burst" mode, as it is known in the art. In this case, the production and consumption tasks must be tailored to organize their data so as to obtain good performance. Conversely, if the data access functions are complex, of DMA type for example, then the DMA tasks can reorganize the data and thus help to simplify the processing tasks. For example, to carry out a communication from cluster Cl0 and to cluster Cl15, several conditions must be fulfilled. First of all, a DMA task managing the dispatching of data to the cluster Cl15 or to the central memory 34 must be activated in the cluster Cl0. That is to say that all its minimum prerequisites are satisfied, for example the recipients of the data are ready as is the first set of data to be dispatched. The send task must then be allocated to a DMA resource in the cluster Cl0. Moreover, a DMA task managing the reception of data coming from the cluster Cl0 must be activated in the cluster Cl15. Moreover, a memory space must be available for receiving the data. Finally, the physical communication path must be open, that is to say the nodes of the NoC 31 must be configured to allow the transmission of the data. It is apparent that a certain number of synchronizations must be adhered to so as to ensure a communication. Notably, there exists a dependency between the DMA tasks so as to ensure that the sender and the receiver are indeed present simultaneously. In the particular case of parallel communications, for example when the cluster Cl15 may receive data from several sources, it is necessary either to have available sufficient DMA resources in the cluster Cl15 to execute DMA receive tasks in parallel, or that DMA receive tasks are placed on standby in the cluster Cl15, each communication integrating an identifier making it possible to ascertain the DMA receive task to be executed. Indeed, each channel is managed by a pair of DMA tasks, one a send task and the other a receive task. Thus, a convergence is seen from the receiver side as a superposition of DMA tasks, one per incoming channel. This makes it possible to efficiently manage the phase shifts between the incoming flows. On the send cluster Cl0 side, it is also possible for there to be several communications to be managed in parallel. If this is the case it is therefore necessary either to have available sufficient DMA resource in the cluster Cl0, or an arbitration function which manages the DMA tasks. For example, the task manager 62 can undertake this arbitrator function. However, for reasons of performance and bandwidth management on the NoC 31, it may turn out to be preferable to integrate the arbitration function into a manager dedicated to the DMA tasks which is located as close as possible to the DMA functions and consequently is more reactive. A possibility of optimization integrating a "multicast" mode and/or "broadcast" mode allowing simultaneous dispatching to several recipients should be noted here. This option is, however, expensive and its profitability must be studied on a case by case basis for each type of platform. In the same way, several reception DMA tasks can be managed, either by the task manager 62, or by the manager dedicated to the DMA tasks. Such a manager dedicated to the DMA tasks, notably if it is implemented in only one of the units 40 to 43, has however a limit in terms of number of DMA tasks that it can manage. It is therefore very improbable that all the DMA tasks of an application may be managed simultaneously by this dedicated manager. In such a context, a collaborative approach can be envisaged between the task manager 62 and the manager dedicated to the DMA tasks. The task manager 62 would for example be responsible for selecting and deselecting the DMA tasks having to be managed by the manager dedicated to the DMA tasks. Advantageously, the necessary memory space in the banks 44 to 59 that is required for the reception of each communication can be guaranteed during the compilation and the static distribution of the tasks by link editing for example. The opening of the communication path is a step intimately related to the nature of the network integrated into the system, namely the NoC 31 in the present exemplary embodiment. A network interface unit is therefore in charge of the exploitation of the network, namely the DMA interface 61 in the present exemplary embodiment. For example, the interface 61 is in charge of the packetization and the writing of the header for a network of "packet-switch" type. For a network of distributed "circuit-switch" type, a port for partial configuration of the network must be provided. If the network is a non-distributed structure of "circuit-switch" type, a centralized unit must be added to the system and one of the two DMA tasks involved in the communication must ask it for the creation of a path if the latter does not exist. For a structure of bus type, a sharing mechanism must be present in each cluster among Cl0 to Cl15. On the other hand, no routing mechanism is then necessary any longer, since the protocol of the bus is charged with the identification and synchronization of the communicating elements.

It is important to note that the present invention, although based on a parallel hardware architecture and on an execution model making it possible to exploit this parallelism, lends itself, however, to sequential processing operations of data flow type. In the example of FIG. 5, several means can be used to synchronize and share data between the PEs during a processing of data flow type. It is however important to maintain a uniform inter- and intra-cluster solution, so as to ease the programming of the architecture. For example, the tasks executed in the cluster Cl0 and reaching their memory quotas can automatically go idle without involving the cluster management module 60. This entails a local synchronization mechanism, which must be available not only between each of the units among 40, 41, 42 and 43 participating in the data flow processing, but also available between each of the clusters among Cl0 to Cl15 if the processing is distributed between clusters. The detection of a full or empty destination memory space can be carried out by virtue of the previously presented system of quotas. In a preferential manner the cluster management module 60 is used to manage the synchronizations between the various PEs. Even though this method increases the penalties due to synchronizations, it affords a more general picture of the execution state of the various allocated tasks. This mechanism forms the subject of a more detailed analysis through a few applicational examples.

A functional specification of each of the management means can be proposed, independently of the embodiments adopted.

The means for managing the tasks encompass all the mechanisms which make it possible to update the state of the tasks on the cluster. A minimal implementation ought to reveal at least two possible states for a given task: the standby state and the ready state. The standby state is characterized by the fact that the task may not be executed through lack of at least one element necessary for its execution. The list of necessary elements can be very varied. By way of example may be cited the availability of a PE, the availability of memory or of data to be processed. This list can also depend on the nature of the task. Thus a communication task will not necessarily have the same types of requirements as a processing task. The ready state is characterized by the fact that the task can employ all the resources necessary for its execution. The allocation carried out by the means for managing the tasks is virtual, since they are not in charge of setting up the physical link between the task and the execution resources. The way in which the system is implemented can lead to the addition of further states, so as to take better account of certain alterations in the execution of the tasks. By way of example, a given task may have begun its execution, and then be preempted during processing.

The means for managing the PEs encompass all the mechanisms which make it possible to allocate a task to a PE. Thus, at least two states can be associated with each PE: the free state and the allocated state. The free state is characterized by the fact that the associated PE is not allocated to a task. The allocated state is characterized by the fact that the associated PE is allocated to a task. Unlike the task management means for which allocation is virtual, the means for managing the PEs carry out a physical allocation of the resources. Just as for the management of the tasks, the way in which the system is implemented can lead to the addition of further states so as to take better account of certain alterations in the management of the PEs. By way of example, the implementation of idle modes or low consumption modes for the PEs can be handled.

The memory management means encompass all the mechanisms which make it possible to allocate memory, to associate it with one or more given tasks and to maintain it as long as the data item is potentially useful. The memory space allocation is aimed at reserving a memory space portion previously considered to be free, that is to say no longer containing data that needs to be held locally, so as to be able to associate it with tasks. The association thereafter allows the allocated memory space to be used by one or more tasks for the processing requirements: for example reading or writing of the data respectively produced or consumed, or even for intermediate processing operations. Rights management will be able to ensure that an unstable data item, that is to say one being written or being modified by a task, is not available in read mode for other tasks. Finally, a memory space can be freed either in the form of an explicit command or because it no longer has any allocation, or by a combination of the two mechanisms.

When several clusters have to exchange data or information by way of a communication channel, it is useful to set up means for managing the communications which encompass all the mechanisms allowing control and management of the communication structure. These management means are very dependent on the nature of the communication structure. Thus, in the case where a bus is used, this can include the management of the priorities and addressing. In the case of an NoC, this can include management of the routing and of the bandwidth associated with each communication.

The means for managing the cluster consist at the minimum of all of the following management means: means for managing the tasks, means for managing the PEs, means for managing the memory. If several clusters have processing operations that must communicate with one another, it is also useful to have a means for managing the communications. All the interactions between these management means and the remainder of the platform, as well as the mechanisms useful for their synchronizations, are encompassed within the means for managing the cluster.

The manner of operation of the present invention is illustrated subsequently through three very different examples of execution. An exemplary video decoding application illustrates a data flow sequential processing. An exemplary morphing application illustrates a processing which is much less regular at the level of its accesses. Finally, an image processing application illustrates a massively parallel processing, with the dynamic control flow.

FIGS. 6 to 11 illustrate an exemplary execution of a morphing application. A morphing application is used for motion estimation in certain advanced image compression and decompression algorithms, to take account of effects that are more subtle than the customary translation of "macroblocks" according to the usual image processing terminology. Much less regular at the level of its accesses than a traditional motion estimation of "block-matching" type, it makes it possible in theory to increase the compression rates obtained in the video coder. The data are more compact, but at the price of more complex computations that are more directed by the data. It is a more intelligent algorithm, and, in this respect, it is more demanding in terms of memory access and processing operations. The principle of the algorithm is a deformation of the image which makes it possible, inter alia, to model zooms or rotations of the camera. This algorithm is also used for texture computations in graphical rendition systems. The basic morphing algorithm can be translated in the following manner into code form in the C language:

```
for (x=0; x<XM; x++)
    for (y=0; y<YM; y++)
    {u=F_x(x);
    v=F_y(y);
    dest[x][y]=src[u][v];}
```

The constants XM and YM represent respectively the width and the height of an area of interest. Several important assumptions are made so as not to unduly simplify the implementation of this algorithm on the proposed architecture. First of all, the assumption is made that the functions $F_x$ and $F_y$ are differentiable. This assumption is reasonable for a real transformation system. Moreover, the assumption is made that the computation time for the functions $F_x$ and $F_y$ is sufficiently large with respect to the time for communication with the central memory. This assumption is necessary for the implementation of parallelism on such a platform, otherwise the processing is entirely directed by the transmissions with the memory and the parallelism cannot be exploited. Finally, the assumption is made that the image is High Definition (HD), or at the least that it cannot be contained in the local memories of the clusters embedded on the chip, this is why the "src" and "dest" fields are contained in the central memory. This assumption is obvious within the framework of the current technologies. It also makes it possible to show specifically how the exchanges with the central memory proceed.

When splitting this code part into elementary activities, it is assumed that it operates on four clusters and that the genericity of the reasoning must not be broken. But this implies that the processing operations are sufficiently computational to occupy these four clusters. Within the framework of the search for transformations, this assumption is entirely realistic. Thus, on each cluster, the distribution of the processing operations over the PEs is as follows:

- four execution tasks for the computations Fx and Fy, which are the most expensive computations;
- a processing charged with evaluating the limits of the macroblock to be loaded from the central memory and from the neighboring clusters, if appropriate;
- a DMA processing for the loading of the macroblocks;
- a main processing of the loop which performs the morphing with the block loaded on the basis of the computed/predicted macroblock;
- a DMA processing to signal the macroblock currently loaded in the local memory of the cluster to the neighboring clusters;
- a DMA processing to output the data transformed in central memory.

Figure 6:
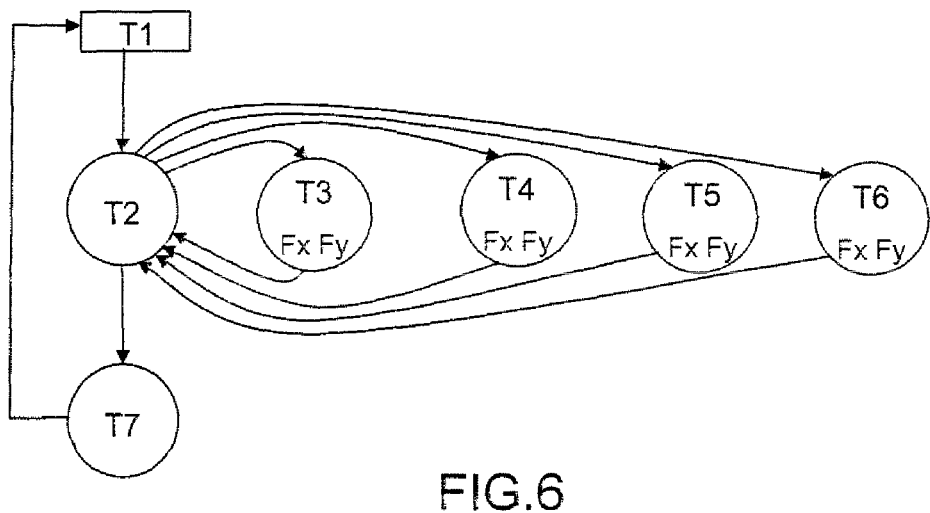
FIG. 6, through a chart, the tasks for implementing according to the invention a "morphing" application.

In a tasks chart, FIG. 6 illustrates tasks T1, T2, T3, T4, T5, T6 and T7 that may correspond to these processing operations. In this figure, the tasks executed on the PEs appear in a circle and the tasks executed on the DMAs in rectangles. This formalism will be adhered to throughout the present patent application. The tasks T1, T2, T3, T4, T5, T6 and T7 will be detailed subsequently.

The routing of the communications is done as a circular chain between the various clusters. The mapping of the tasks is done sequentially in the order of the chain defined by the communications. The first cluster receives the processing task of the first macroblock, the second cluster receives the processing of the second macroblock and so on and so forth until the fourth cluster. Then the first cluster chains together on the fifth macroblock and so on and so forth. All the processing operations of the image blocks are mapped to the four allocated clusters.

An execution on a cluster is conducted locally as follows. The DMA access is engaged for the predicted macroblock. The initialization of the prediction of the macroblock is done as a uniform grid of the High Definition (HD) page, the grid being proportional in height/width and tailored to the memory capacity of a cluster. For example, it must not fill more than 75% of the local memory of the cluster. As soon as the loading in progress terminates a predicted-macroblock line, the DMA processing warns the manager of the memory and task. The main processing begins in parallel with the loading. Nonetheless, this processing can only actually take place in the processing area of the current block, that is to say on the basis of Fx(xm) and Fy(ym). This is ensured by a mechanism for preparing the data locally for the PE doing the processing, commonly termed "fetch" in the art.

The "fetch" mechanism simply disables the task if the source data have not yet arrived at the time of reading them, doing so until the data are available. If the source coordinates computed in parallel on the four PEs are not yet available, the task is stopped by the task manager because of unresolved dependency. They are then in the "stalled" state, as it is known in the art. If the source coordinates computed exceed the predicted widened macroblock, the memory manager uploads an exception to the task manager because of overflow of the allocated memory areas. This behavior is entirely exceptional for regular transformations. Thus, this autoregulation mechanism produces the output macroblock in tandem with the arrival of the input data. Error cases are also managed naturally.

The main processing supplies the DMA output processing in tandem, by way of a memory area used in "buffer" mode, as it is known in the art. The main processing supplies the four processing operations of transformation/morphing computations with pairs of points (x,y) to be computed/processed and waits for the results (u,v) therefrom. It also provides the current limits of the transformation, so as to supply the next memory macroblock's prediction processing. The next macroblock's prediction processing uses the previous data of macroblock limits and the current data to make a prediction. For example, it can make the prediction by extrapolating the derivative or optionally the second derivative. But in view of the difference between the sizes of images and the sizes of macroblocks, it is probable that the difference between the two extrapolation algorithms may be hardly perceptible.

Figure 7:
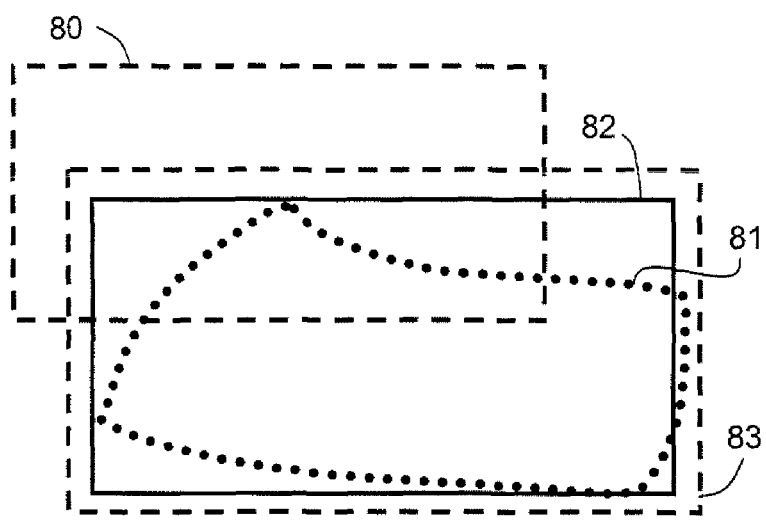
FIG. 7, through a diagram, a prediction and a block transformation in a "morphing" application according to the invention.

FIG. 7 illustrates a block prediction and transformation algorithm. The general transformation of an (x,y) rectangular block 80 by the functions Fx and Fy culminates in a (u,v) domain 81 of the source. A box 82 is the XY envelope rectangle predicted by virtue of the linear or quadratic extrapolation arising from the previous transformations of the same (x,y) domain. For this purpose, the speeds of this envelope rectangle are evaluated at each transformation. In the case of quadratic extrapolation, the accelerations of this envelope rectangle are evaluated. A margin 83 is taken around this prediction rectangle so as to be reasonably certain that the source points of the transformation are in the local memory of the cluster. This is not compulsory, but makes it possible to avoid the exception process. The dimensions of the final rectangle to be loaded are therefore dependent on the data. But though the X and Y dimensions can vary very freely as a function of the transformations performed, the area of the rectangle is for its part constant. Therefore the memory used is constant on a cluster. Moreover, a possible optimization consists in contriving matters so that the additional data loaded are not discarded, but transmitted to the neighboring cluster, so that there are fewer needless accesses to the central memory.

The task T1 is a DMA loading task for the memory block, which is arranged taking account of the data already present on the adjacent cluster. The dependency of this task is related to the image synchronization and to the availability of a channel for communication with the DRAM. For the first cluster, the task T1 is activated as soon as the application is launched. The tasks T1 executing on the other clusters are activated thereafter as the blocks are consumed. The parameters computed in the previous go are used. When dealing with the first image, T1 uses the default downloading parameters. The task T2 is of main loop, that is to say a distribution task for the morphing computation. The dependency of T2 is effected on the availability of data of the loading block provided by T1. The tasks T3, T4, T5 and T6 are morphing function computation tasks. They supply XY envelope prediction buffers by providing the extreme pairs (u,v) for each line processing, the task T3 for extremal obtained from the x minima and the task T6 for extremal obtained from the x maxima. The task T7 is a rectangle prediction computation task. The dependency in terms of data is effected on the data provided by T3 and T6. It provides the prediction rectangle for the task T1 at the next pass.

Figure 8:
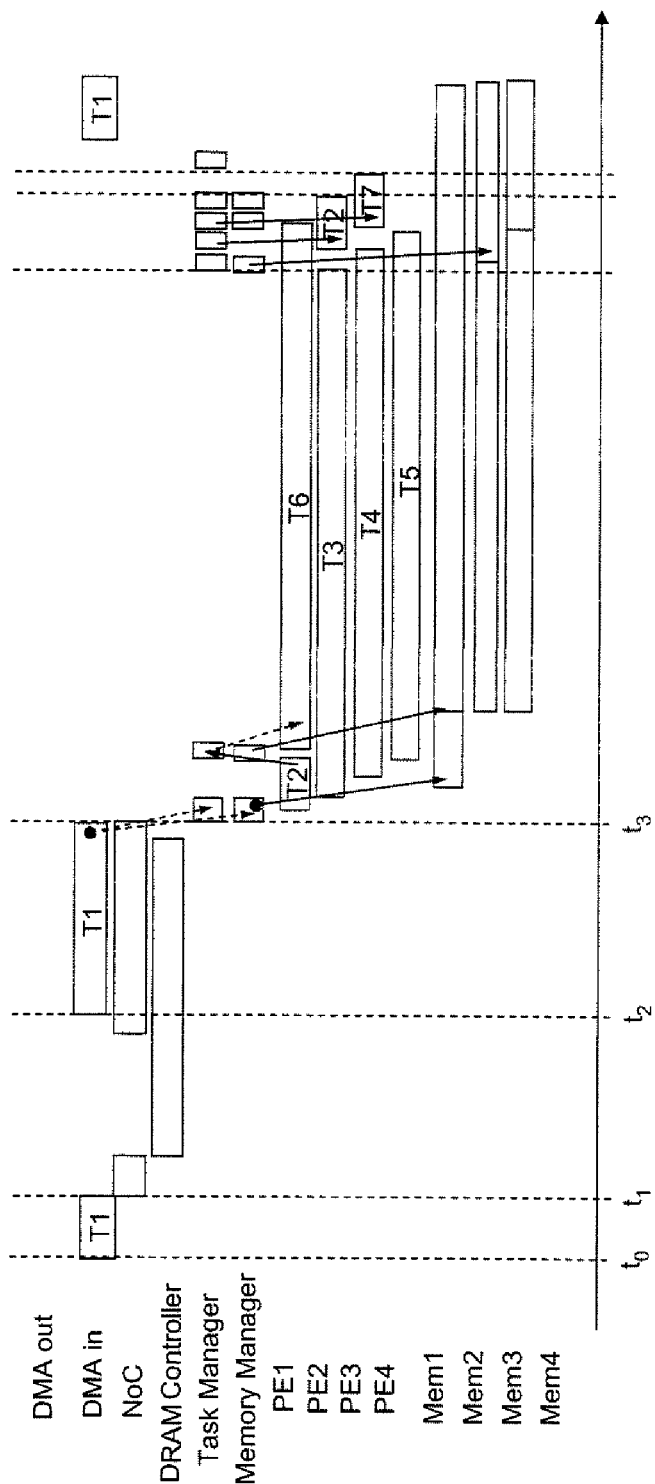
FIG. 8, through a timechart, the tasks executed on a cluster during a "morphing" application according to the invention.

FIG. 8 illustrates by a timechart an execution scenario for a cluster. FIG. 8 is simplified, since it shows only a single transfer of packets from the memory. A real execution would give rise to more overlap between communications and execution.

First of all, the task T1 requests loading of the envisaged rectangle to the DRAM controller, and then waits from an instant $t_0$ to an instant $t_1$.

Next, the DRAM controller uses the information provided by the tasks T1 to download the memory blocks in DRAM and dispatch in tandem the blocks to the various clusters, from the instant $t_1$ to an instant $t_2$ and then from the instant $t_2$ to an instant $t_3$.

Thereafter, when data are transmitted to the cluster at the instant $t_2$, T1 takes control and announces the loading of each data block to the task controller for the resolution of the dependencies and to the memory manager for the updating of the assigned memory blocks. This is illustrated by two arrows starting from T1 at the instant $t_3$.

Hereinafter, the task manager sets T2 executing. The task T2 distributes points of (u,v) pair computations to the tasks T3, T4, T5 and T6.

Next, the task manager sets the tasks T3, T4, T5 and T6 as tasks to be executed on the PEs. Four free PEs having been allotted to the tasks, the task manager transmits to the memory manager for each task the lookup table of correspondence with the virtual memory, also called "mapping of the virtual memory", which has been associated with them by the compilation tools. This step can be started well before if PEs are free, and then as and when they become free. For example, a fine arrow from T2 on PE1, on task manager, returns to T6 scheduled on PE1.

Thereafter, the memory manager constructs the local-translation tables for each task with the data currently present and transmits them to the PEs chosen by the task manager. This is illustrated by an arrow starting from the memory manager and going toward Mem1 just after the instant $t_3$. Identical arrows toward Mem2 and Mem3 for the tasks T3/T4 and the tasks T5/T6 respectively have not been represented in order to simplify FIG. 8. It should be noted that, on the timechart of FIG. 8, the arrows going from the memory manager and going toward the memories do not correspond to a real signal from the memory manager to said memories. They correspond simply to the updating of the memory manager allocation tables.

In parallel, the task manager provides each chosen PE with the order to begin the task. As soon as the arrangement of the code is provided by the memory manager, the start of the code is loaded into the local memory of the cluster and execution begins: start of the loop and then launching of the computations of Fx and Fy by the tasks T3, T4, T5 and T6, the launching of which is done in tandem after the instant $t_3$.

Figure 9:
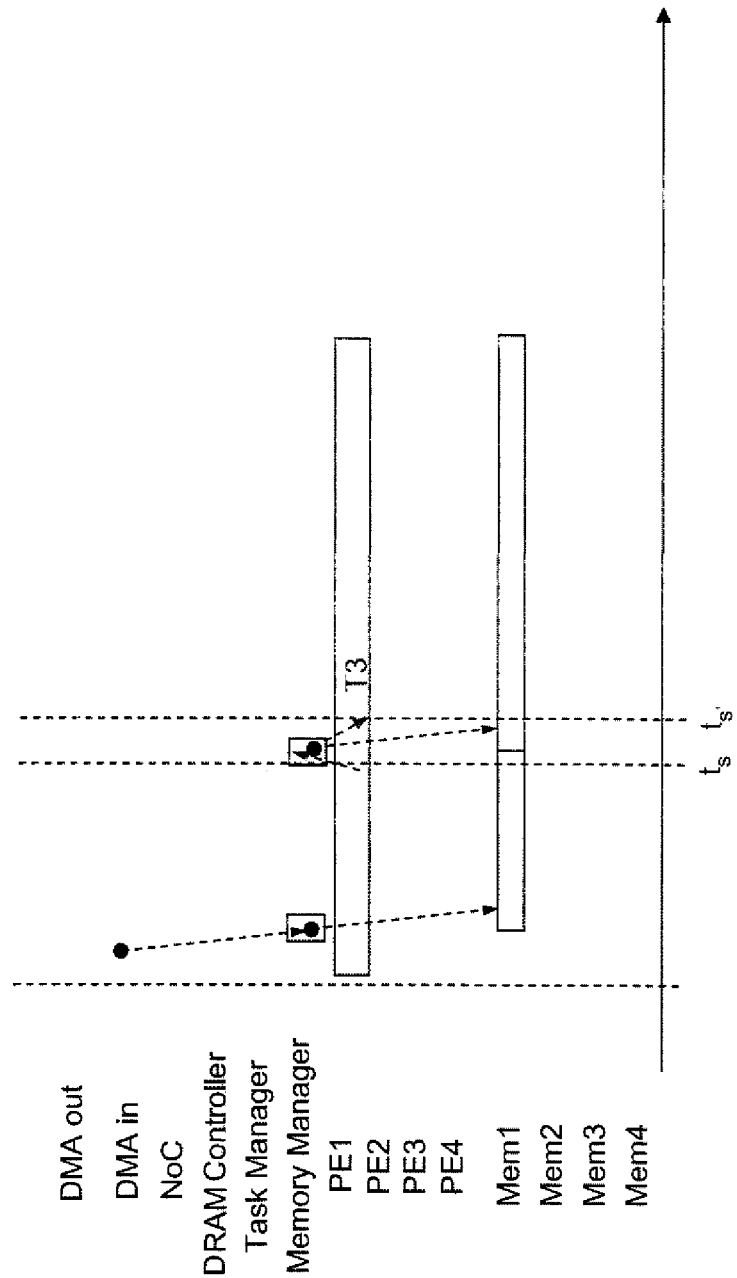
FIG. 9, through a timechart, the exchanges occurring when updating translation tables during a "morphing" application according to the invention.
Figure 10:
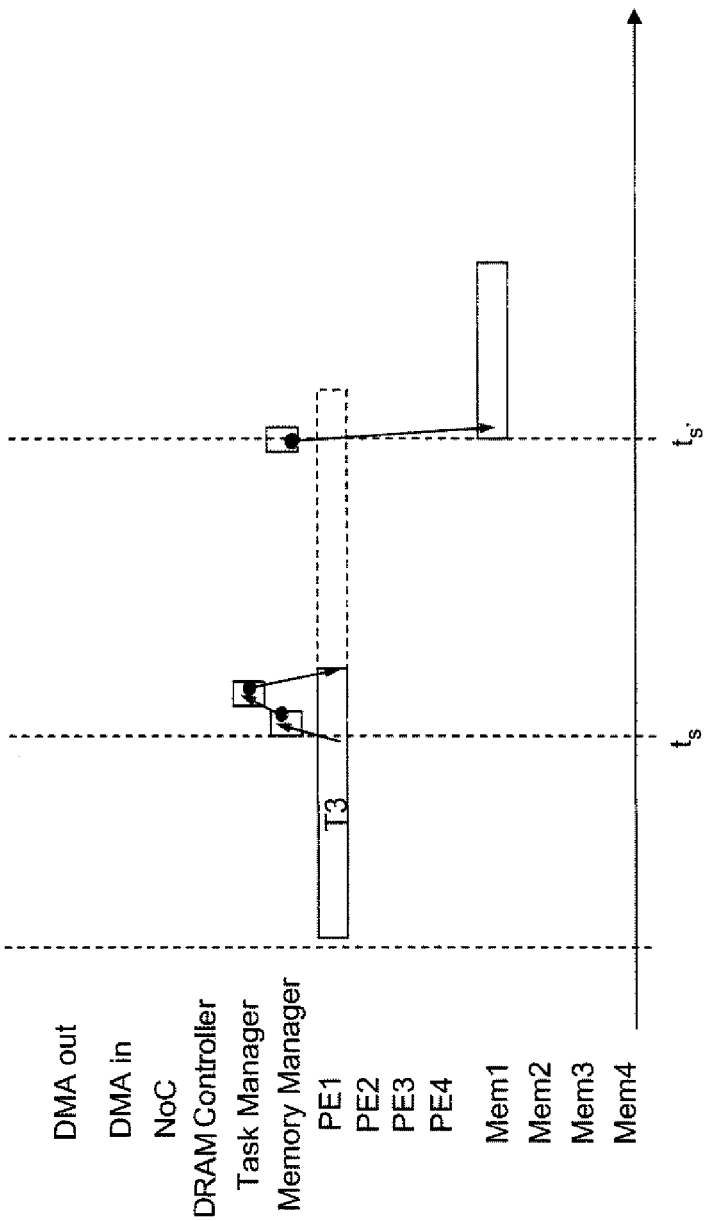
FIG. 10, through a timechart, the exchanges occurring upon a break in the input flow for a task during a "morphing" application according to the invention.

When the computations of a pair (u,v) are finished for T2, the subsequent execution makes it access a coordinate of the source image. The following cases can arise:

the data item is in local memory of the cluster. In order to be manipulated this data item must be accessed by the PE assigned to its processing. Two cases can therefore occur depending on the state of the PE translation table:
  the PE's local translation table is already up to date: the PE therefore knows how to access it and can therefore manipulate the data item so as to carry out the processing assigned to it.
  the PE's local translation table is not up to date: the PE does not know how to access the data item, the information item is transmitted to the memory manager which sends back an update of the PE's local translation table. FIG. 9 illustrates by a timechart the duration corresponding to the time of suspension of PE1 between two instants $t_s$ and $t_{s'}$, the time required for updating its translation table.

the data item is not in local memory of the cluster. Initially, however, this happens as in the previous case, when the local translation table is not up to date: the PE transmits the request to the memory manager. Subsequently, two sub-cases can be distinguished:

the data item forms part of the data which are envisaged on the cluster according to the data provided by the task manager to the construction of the tasks. The information item according to which the task which is executing on the PE is disabled, on standby awaiting data from the task T1, is dispatched to the task manager by the memory manager. FIG. 10 illustrates by a timechart the duration between an instant $t_s$ and an instant $t_{s'}$, corresponding to the minimum time of suspension of the execution of T3.
  the data item does not form part of the data envisaged on the cluster by the envelope prediction task T7: an exception is uploaded by the memory manager to the task manager for invalid memory access. The task manager launches a task T1' on this event so as to load the missing data item and its vicinity. The task T1' is not represented in the figures.

Thereafter, the source point is stored in the local memory of the cluster producing the task. At each line end, the task T2 produces the extrema of the current line for (u,v), so as to supply the task T7. For all the lines or a few lines, the task T2 dispatches an intermediate production signal for the extrema, so as to allow T7 to continue its execution on the newly produced data.

The task T7 waits for at least one event of T2, according to the same principle as between T1 and T2. It uses the extrema, plus those of the previous image, to compute the new rectangle to be loaded, or indeed those of the yet previous image for a second-order computation. If the task manager so allows, that is to say if a PE is free, the task is periodically set re-executing on each arrival of a pair of extrema. Once per block, the task T6 produces its prediction for a future loading and dispatches the end of block processing event.

The DMA task T8 merges the production buffers for T3, T4, T5 and T6 in tandem with the arrival of a quartet of production events for these 4 tasks. It transmits the update of the destination image to the DRAM controller. It transmits the unused source image data to the following cluster in the list, since it needs them for the processing operations.

According to the dependencies, the termination of the tasks must therefore begin with T1, knowing that a task T1' can rarely appear. Next follow the tasks T3, T4, T5 and T6 according to an order which depends on the difficulty of the processing operations and the random vagaries of loading. Thereafter follow T2 and T7 whose processing is short, with local data only. Finally follows a task T8, not represented in the figures, which marks the end of the processing of a block. From the end of T7, the task manager can relaunch T1 with a new block.

The task manager is composed of various elements among which:

a list of the tasks comprising, for each task, the list of the minimum dependencies necessary for its startup, the events conditioning its execution such as a quota overflow or a standby awaiting data, and optionally a descriptor of the virtual memory space manipulated;

a list of the virtual PEs usable by the task manager for allocating the next tasks. This list is termed virtual since the physical identification of the allocation of the PEs may be managed by the management means of the PEs, in relation to an availability of the PEs without necessarily identifying them physically;

a list of tasks ready to be executed, satisfying all their prerequisites;

a scheduler charged with matching up the tasks ready to be executed with the corresponding PEs available on the cluster. The most relevant scheduling policies depend in general on the field of application. For example, a critical time-real scheduling can advantageously use a scheduling policy based on the EDF ("Earliest Deadline First") scheduling algorithm which gives priority scheduling to the tasks with the tightest deadlines. For a multimedia system with weaker constraints, a less expensive linear-time scheduling is probably better tailored. This is why it is preferable for the scheduler to be programmable, reconfigurable or at least parametrizable.

The main role of the task manager on a cluster is therefore to manage the fit between the PEs and the tasks. It must also manage the chaining between the tasks, this generally embracing two aspects: a data dependency aspect and a control aspect. Note that, more often than not, a control aspect can be simulated by a correctly set up data dependency. Thus, the task manager is one of the central elements of the cluster. It receives multiple events originating from the various tasks, including the DMA tasks, these events relating to the production of data. But it also receives events originating from the memory manager, to signal tasks which are on standby awaiting data or available memory space. More exceptionally, these events signal the tasks which exceed their allocated memory quota. In the latter case, the role of the task manager is to seek to limit the problems, by disabling if possible the task which caused the quota to be exceeded. This aspect will be detailed subsequently, in conjunction with the controls of flows in the second exemplary application.

Figure 11:
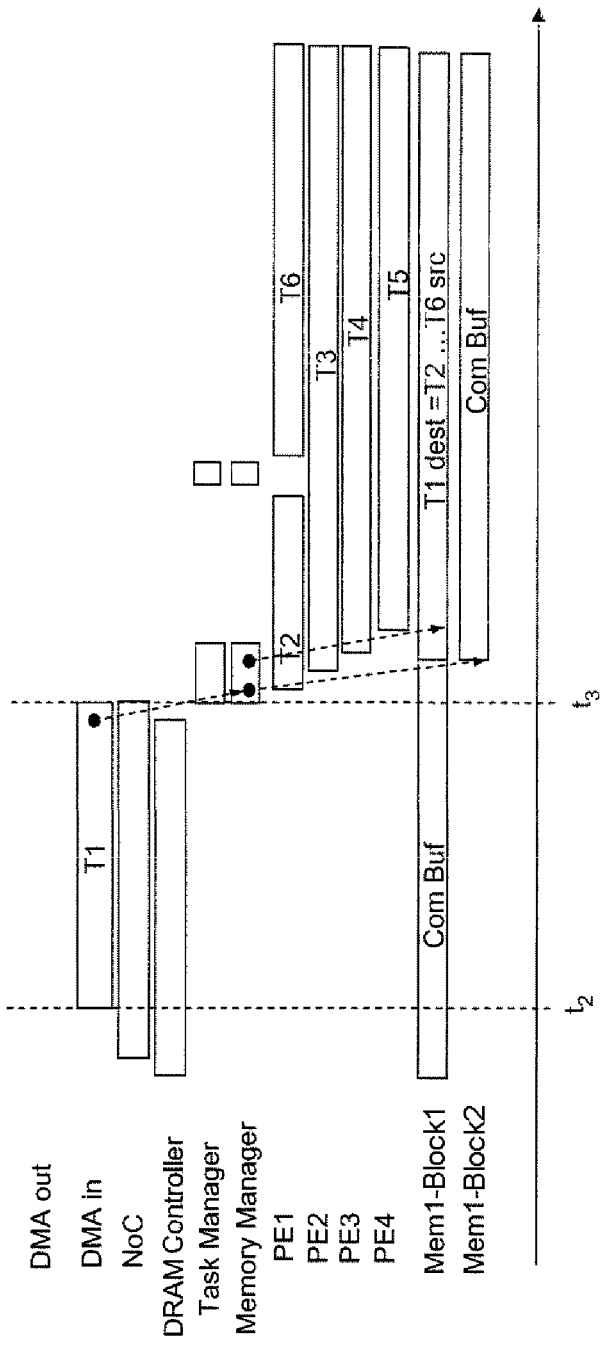
FIG. 11, through a timechart, a communication during a "morphing" application according to the invention.

The local memory space of the cluster is managed by the memory manager. It must allow as transparent as possible an execution of the tasks on the PEs. In the present example, it must be able to render transparent the use of a High Definition image which does not fit on the chip, and still less on a cluster. For this purpose, it needs data production and usage tables, which match the correspondence between the virtual memory and the tasks in the local memory of the cluster. It also needs the assistance of the tasks which must tell it when they have produced or finished using data stored in the local memory of the cluster, by dispatching a signal to the cluster manager. For this purpose, special instructions can for example be inserted into the code of the tasks by the compilation tools or by the programmer. It must also provide and update the memory translation tables for the PEs. In the previously illustrated scenario of executing the morphing application, the interactions between the memory manager and the remainder of the cluster can be synthesized in the following manner:

first of all, the various tasks are started up: as long as the task T1 has not received the requested data, the translation tables at the cluster level and at the level of the tasks T2 to T6 are not fed with the data of the predicted block. If nonetheless the memory accesses occur in the predicted block, the memory manager simply tells the task manager that the data requested by the tasks are not yet available. The task manager can, according to the scheduling policy and the tasks present, choose to leave the tasks on standby or commute them to switch them for other more urgent ones:

if the requested address is outside what the task is presumed to be able to access, an exception is uploaded to the task manager. If this involves access to the source image, the exception procedure must therefore manage a loading prediction error. The other cases do indeed involve an error, to be processed as such. The way of managing this at the task manager level depends on its programmability level. This can be programmed as an exception program for the task manager, or simply be processed as a signal to launch the exceptional-loading task T1'.

each time T1 produces a data block, it informs the memory manager of this. As illustrated by FIG. 11 by virtue of a detail of the timechart around the instant $t_3$, the memory manager:

deallocates a block 1 corresponding to the communication, this being illustrated by "Com. Buf." on "Mem1-block1" at the instant $t_3$ in FIG. 11;

reallocates a new block 2 for the communication so as to compensate for the one lost in respect of the communication channel, this being illustrated by "Mem1-Block2" in FIG. 11:

if this reallocation fails, an exception signal is uploaded to the task manager to signal that the communication is at fault.

assigns the block to the consuming tasks T2 to T6, while verifying that the memory quota for this data item is not exceeded for each task. If this memory quota is exceeded, a signal is dispatched to the task manager to disable the network transmission channel. Otherwise, the memory manager can, when choosing the implementation:

systematically warn the task manager and update the local translation tables for the tasks T2 to T6;

wait until it has updated the address translation table with all the addresses requested by a task before signaling to the task manager that the corresponding task can be restarted. This implementation is the most effective, it will be preferred as far as possible.

the memory manager also receives the data production signals on the part of T2 for the task T7, and the end-of-usage signals for the blocks of data loaded by T1. Thus, when the tasks T2 to T6 have all dispatched an end-of-usage signal for a given block, a comparison of the labels of the tasks which dispatched this signal with the content of the list of labels of the tasks using these data allows the memory manager to free the portions of the local memory space of the corresponding cluster, for reuse by other data;

just as for the tasks T2 to T6 with the data produced by T1, the task T7 can be activated in tandem with the production of the extrema of the transformed block.

in tandem with the production of the destination image, the task T8 transfers the data to DRAM through the NoC, and frees the blocks of local results which can therefore be reused;

optionally, the supernumerary data loaded in the "prefetch" phase as it is known in the art, which is a mechanism for early loading of the data, can be transmitted to the following cluster which can thus avoid having to pass through the DRAM to obtain a part of the data that it needs.

The mechanisms for executing a morphing application highly directed by the data on a massively parallel architecture according to the invention have been described. Making appropriate use of the potential parallelism in such a context is very tricky but achievable by virtue of a "prefetch" mechanism which is both aggressive and efficient. The "prefetch" prediction error boxes are also taken into account by an exceptional procedure which is, however, simple to implement. Access to the data is a fundamental point of parallel architectures, which is particularly developed in the execution model in regard to the architecture according to the invention.

Figure 12:
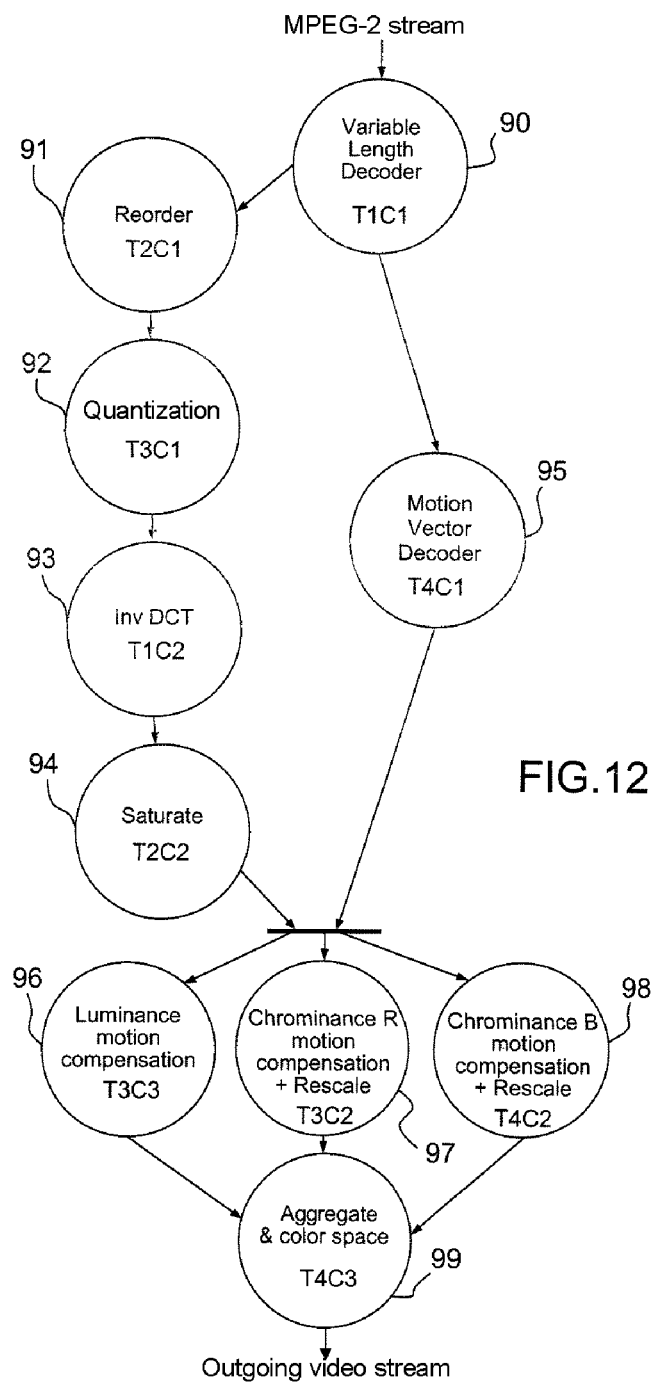
FIG. 12, through a chart, a flow of data in an MPEG-2 decoding application according to the invention.
Figure 13:
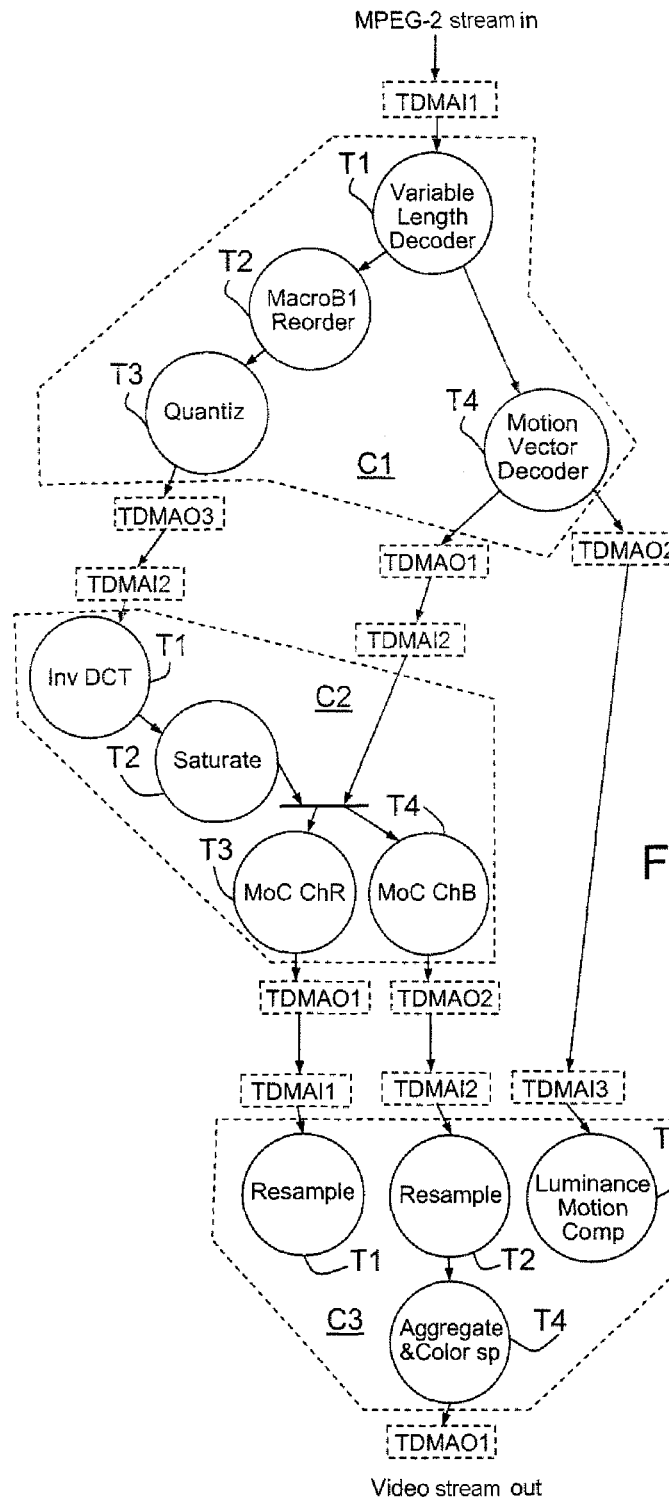
FIG. 13, through a chart, tasks mapped and routed during an MPEG-2 decoding application according to the invention.
Figure 14:
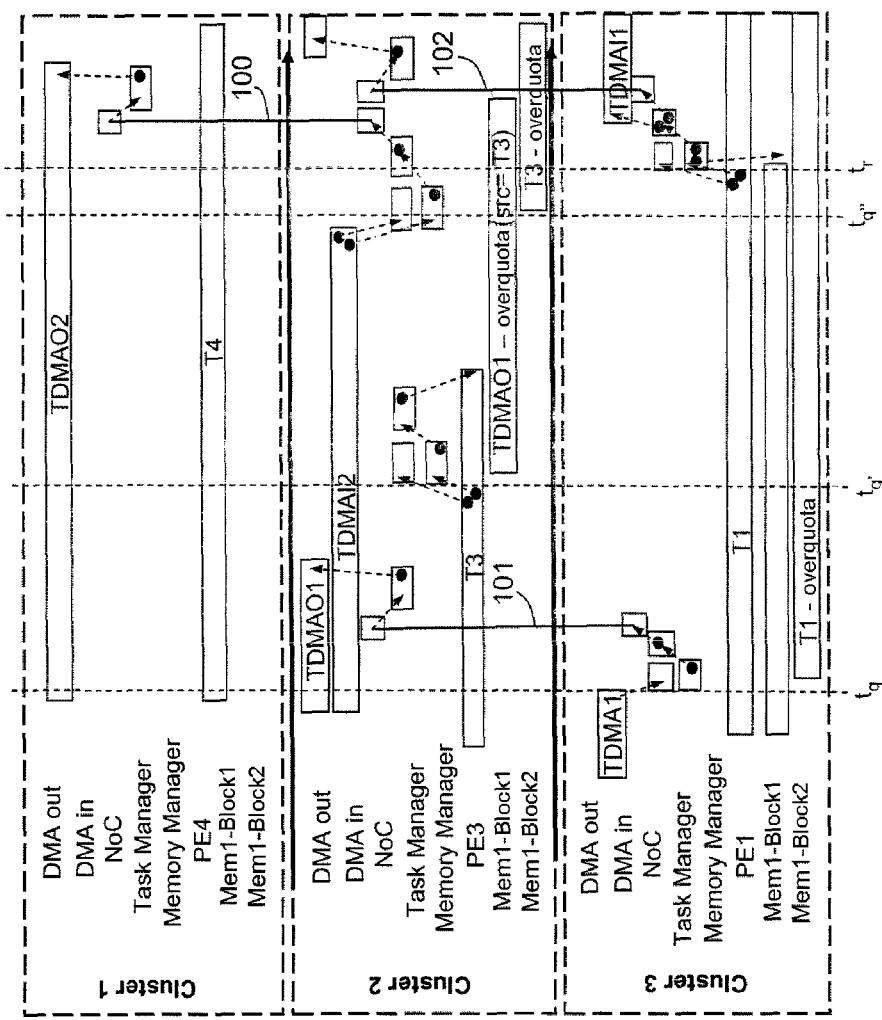
FIG. 14, through a timechart, the management of the communications during an MPEG-2 decoding application according to the invention.

FIGS. 12, 13 and 14 illustrate an exemplary execution of an MPEG-2 decoding application. Today, MPEG-2 decoding is no longer considered a difficult application. It does not require specialized processors, but remains a tricky application in a monoprocessor framework when involving "Full HD" images, as they are known in the art. It is especially a noteworthy application since it is typical of the data flow sequential processing operations. Moreover, it will probably be inescapable in the future, the applications which transmit video streams proliferating. MPEG-2 decoding is therefore a demonstrative industrial application of an important field for forthcoming embedded systems.

In a tasks chart, FIG. 12 illustrates a split-up into typical tasks of the MPEG-2 decoding. This chart does indeed illustrate a model with a significant data flow aspect, making it possible to analyze the implementation of the architecture according to the invention for processing operations of this type. It illustrates a variable-length decoding task 90, a macroblocks data reshaping task 91, a quantization task 92, an inverse discrete cosine transformation task 93, a saturation task 94, a motion vector decoding task 95, a luminance motion compensation task 96, a motion compensation task 97 for the red chrominance, a motion compensation task 98 for the blue chrominance and an agglomeration and transformation of color space task 99. In the present example, the assumption is made that the clusters comprise four PEs and that the tasks are allocated statically to the PEs. This assumption is close to what is done on prior art dedicated decoding or encoding systems. It is not an intelligent implementation on the proposed platform. Basic tasks, including the tasks of FIG. 12 and DMA tasks for transferring data between the clusters 1, 2 and 3, are distributed in the following manner:

Cluster 1:
  a task TDMAI1C1: DMA import of the MPEG-2 stream into cluster 1,
  a task T1C1: variable-length decoder;
  a task T2C1: reshaping of the data of macroblocks;
  a task T3C1: quantization;
  a task T4C1: motion vector decoder;
  a task TDMAO1C1: DMA export of the chrominance motion vectors;
  a task TDMAO2C1: DMA export of the luminance motion vectors;
  a task TDMAO3C1: DMA export of the quantized macroblocks.

Cluster 2:
  a task TDMAI1C2: DMA import of the chrominance motion vectors;
  a task TDMAI2C2: DMA import of the quantized macroblocks;
  a task TDMAI3C2: DMA import of the reference chrominance macroblocks;
  a task T1C2: inverse discrete cosine transform;
  a task T2C2: saturation;
  a task T3C2: motion compensation, red chrominance;
  a task T4C2: motion compensation, blue chrominance;
  a task TDMAO1C2: red chrominance DMA export;
  a task TDMAO2C2: blue chrominance DMA export.

Cluster 3:
  a task TDMAI1C3: DMA import of the red chrominance macroblock;
  a task TDMAI2C3: DMA import of the blue chrominance macroblock;
  a task TDMAI3C3: DMA import of the luminance motion vectors;
  a task TDMAI4C3: DMA import of the reference luminance macroblock;
  a task T1C3: red over-sampling;
  a task T2C3: blue over-sampling;
  a task T3C3: luminance motion compensation;
  a task T4C3: agglomeration and transformation of color space;
  a task TDMAO1C3: DMA export of the decoded video stream.

It should be noted that the inter-cluster communication framework always involves two tasks: a data exportation task and a data importation task, for example TDMAO2C1 in cluster 1 and TDMAI1C3 in cluster 3. A communication channel between two clusters is therefore defined by a source memory space, a DMA export task, a communication link, a DMA import task and a destination memory space. If one of these five elements is absent, this implies that there is no communication link between the two clusters in question. It is therefore the responsibility of the mapping/routing tools to ensure that the dimensioning of the memories and network is correct. In the case of communication error due to the absence of one of these elements, the error is detected and an exception is generated. The present document does not provide any additional elements relating to the mechanisms for managing this exception. Such an error does indeed give rise to different processing operations depending on the field of application of the system. With these assumptions, three clusters are necessary in order to decode a video stream. On each cluster, there are therefore four tasks for the PEs, i.e. one per PE. This arrangement is conventional for stream processing operations where, as far as possible, the processing operations are mapped statically and where the load is balanced through the play of production/consumption along the virtual "pipeline" as it is known in the art, the virtual "pipeline" representing the processing of the stream. As explained subsequently, this type of regulation is perfectly possible in the operating scheme of the architecture according to the invention. Moreover, this does not rule out the possibility of thinking about other chunks of applications which would operate in parallel on these clusters and on others, or even of thinking of several decoders on several triples of clusters if the power of the PEs on the clusters turns out to be insufficient for big images. Nevertheless, a task is necessary for ensuring the order of the processing operations at input and at output.

The execution along the software "pipeline" defined by the arrangement of the tasks illustrated by FIG. 13 in a chart can be summarized in the following manner:
  TDMAI1C1 loads the stream in tandem with its arrival in the local memory of the cluster;
  T1C1 has a quota related to the number of advance packets, thereby making it possible to stop the transfers as soon as the number of advance frames is sufficient, probably between 3 and 5 frames depending on the communication latencies. If the management means allows allocation by variable size blocks, it will be possible to finely dimension the quota. If this is not the case it will be necessary for the quota to be a multiple of the fixed size block;
  likewise, T2C1 and T4C1 have quotas on the numbers of macroblocks and of undecoded vectors before saturating. If this tier is reached, the task manager disables the producer task, that is to say T1C1. If the situation does not unblock itself, then neither does the already disabled task T1C1 any longer consume the input data provided by TDMA1C1, thereby culminating in the disabling of the communication. From the moment that the quotas are correctly evaluated, the mechanisms previously described for the controls of quotas make it possible to carry out data stream regulation in an implicit manner, without weighing heavily on the implementation of the processing operations. If they are not correctly dimensioned, the overloads of quotas cause explicit errors of memory allocation or of communication. The underloads of the dips in performance are then readily in evidence. It is taken for granted that the system itself performs its own load balancing under nominal operation, simply by setting the quotas during compilation; taking this for granted, the conduct of the application does not in itself pose any problems. As long as the data of a task are not ready, the task is placed on standby or switched if the system contains other applications and if the scheduling policy so allows. As soon as it has its data, it can perform processing operations and produce output data, unless the consuming task or tasks are too slow to process them. If this is the case, the producer task is suspended by the task manager, because of the violation of memory quota of a consuming task, as explained for the morphing application;

it is apparent that the passage of the data between the clusters is done by taking note of the DMA tasks which define a communication channel, provided that some memory exists on arrival. This channel is related to a routing of the communications between processing operations, arising from the mapping/routing of the processing operations of the application on the chip. The communication therefore involves the source data stored in the local memory of the origin cluster. The communication also involves the DMA send task. The communication also involves the channel of the NoC where the bandwidth has been reserved for said communication by way of the routing. Finally, the communication involves the DMA receive task and its associated memory, reserved dynamically by the memory manager, on the destination cluster. The union of these four elements makes it possible to establish a communication in time and latency which is bounded statically, and therefore deterministic. This property is important for numerous cases of applications, even if it is not the case for MPEG-2 decoding;

the ability to disable the data producer in over-quota for a given consumer makes it possible to selectively disable, and no more than necessary, the tasks dependency chain, including when there is transfer of data through the NoC in the middle of this chain. Resumption is also automatic, everything relies on a control of the memory quotas by the compilation chain. Exception mechanisms are implemented for detecting problems when this dimensioning is defective, as illustrated by an example in the timechart of FIG. 14:

it is assumed that the over-sampling of the red chrominance by T1C3 is over-quota at an instant $t_q$. This is a fairly long operation and, moreover, this cluster is loaded with operations which may demand a significant amount of memory, notably at the end of the video processing chain. Matters may be contrived so that the memory manager informs the task manager, which disables the DMA transfer task TDMAI1C3. As a DMA transfer operation is involved, a message is dispatched to the task manager of the cluster 2 to signal the anomaly. The corresponding NoC communications are illustrated in FIG. 14, these are communications 100, 101 and 102;

the task manager of the cluster 2 disables the DMA send task TDMAO1C2;

if disabling continues, the task TDMAO1C2 passes to over-quota at an instant $t_q'$. If this is the case, the memory manager informs the task manager, which disables the producer task T3C2. At this level, only the local chain for processing the red chrominance is impacted, the remainder continues to operate nominally.

if it is assumed that the disabling is still not slackened, T3C2 can also pass to over-quota at an instant $t_q''$, and this may be done through two non-exclusive scenarios:

over-quota on motion vector: the memory manager indicates the origin of the over-quota to the task manager, which disables the DMA input task TDMAI2C2. A message is transmitted to the task manager of the cluster 1 to disable TDMAO1C1, and this may then cause the disabling of T4C1;

over-quota on the decoded blocks for the red chrominance: the memory manager informs the task manager of the occurrence of the over-quota, which disables the producer task T2C2;

The mechanism is therefore designed to disable the minimum dependency chain, a chain constructed on the dependency tree deduced from the inverse dependency graph whose cycles are removed.

as soon as the task T1C3 is no longer over-quota at an instant $t_r$, the memory manager informs the task manager which re-enables the task TDMAI1C3. The task manager dispatches a message to the task manager of the cluster 2, which re-enables TDMAO2C2. In tandem with the disappearances of the over-quotas, the local memory manager informs the task manager, which re-enables the tasks under the same conditions as the disabling had taken place. The equilibrium of the "pipeline" is therefore a natural emerging property, with simple rules and with the sole assumption of the correct dimensioning of the memory quotas.

if the quotas are poorly dimensioned, the memory manager can detect it simply: the dynamic allocation provided for each data item at input takes place nominally until the flawed situation occurs. At this moment, the memory manager attempts to allocate memory for a request which has been made, but is unable to satisfy it since too much memory has been allocated elsewhere. The memory manager must therefore upload the exception to the task manager. The processing of this type of exception is highly dependent on the field of application and therefore is not specified in the present patent application. It can be used, for example, to detect anomalies in programs, including in dimensioning programs. But it can also be used to make an automatic on-line adjustment of certain memory quotas for non-critical applications.

The remainder of the execution of the application does not pose any particular problem and ought to be simple to deduce on the basis of what has already been described in the two example applications.

It is clearly apparent that the execution model of the architecture according to the invention is also well suited to applications of stream processing type. In this specific framework, it employs simple mechanisms for dynamically balancing the data flows, which are natural for specialists in this type of processing. This proves the very good flexibility of the architecture according to the invention and of its execution model, since it is just as able to manage this type of execution as a much more dynamic task model, as has been seen within the framework of morphing. What is important to understand in this implementation is that the proposed architecture together with its execution model is capable of executing in an efficient manner, that is to say with optimal exploitation of parallelism, the two types of models nested within the same application.

This notably is what constitutes its originality. It is important to note that the support of the data flow mode is effected not only inside the cluster, but also between the clusters. The description of the mechanisms managing the absence of data or the saturation of the memories presages heavy pressure on the task and memory manager. However, the particular management of these modes can be viewed hierarchically. Thus, part of these functionalities, such as placing on standby awaiting data or awaiting available memory space, can be offloaded to the PEs. The task manager is then split into two types of managers. A first type is associated with each PE and ensures the support of the data flow mode. The second which is charged with the allocation of the tasks and their possible interrupts is called the central task manager. The central task manager is then responsible for deciding whether or not to interrupt tasks on standby. However, it is possible to choose the policy which manages recourse to the central task manager. Thus, it is possible to carry out processing operations actually in data flow mode, in which the central manager is not involved.

Another example of execution can be given, that of an application of Hough transform-based image processing, to the very dynamic control flow making massive use of parallelism. The aim of the Hough transform is to find, in an image, contours of simple geometric shapes such as straight line segments, circles or ellipses. This conventional application in the field of image processing is difficult to parallelize. This difficulty is to do with the fact that the results space is necessarily shared between the PEs. Moreover, this application is greedy in memory space. To carry out the Hough transform, the image of the contours is traversed in its entirety, without preferential order on the traversal. For each contour point, it is necessary to compute the set of straight lines able to pass through this point. Each straight line is parametrized by two values a and b, according to the formulation y=ax+b. A parameter space is thus defined where each point represents a pair (a,b). The set of the straight lines which can pass through a contour point of the image is therefore represented by a straight line in the parameter space. The accumulation of these straight lines in the parameter space identifies points of convergence. Each of these points indicates the presence of a line in the starting image. These points make it possible to ascertain the position of these straight lines by recovering the parameters associated therewith. The parallelization of this algorithm is problematic, since each pixel of the contour image is associated with a straight line in the parameter space. If it is easy to distribute the input image, the results space is in essence shared. It is of course possible to make each PE work on a sub-part of the image and to produce a parameter space for each of these sub-images. An additional task must then aggregate all of these spaces so as to form just one. This solution then poses the problem of the amount of memory required, since to carry out a parallelization on N PEs, it is necessary to store at the minimum N+1 images. Such a choice is, however, not in keeping with the context of embedded systems where high silicon efficiency is sought. To conclude, this algorithm can be implemented on an architecture with shared memory, but this parallelization leads to many memory conflicts and must therefore be limited to a fairly weak parallelism. On an architecture with distributed memory, the memory space must be overdimensioned. The problem in its generality demands a consideration of the framework where the memory capacities of the clusters are indeed below what is required by the application. This framework is in keeping with the state of the art of integration techniques and video processing requirements. As explained subsequently, it is possible to parallelize the Hough transform in a more efficient manner by virtue of the present invention, by simultaneously distributing the starting image and the parameter space over the various clusters. Each cluster is responsible for reading an area of the image and for writing a part of the parameter space. For example this splitting can be done by making rectangular shaped meshes. The algorithm is functionally split into two parts on each cluster.

A first part of the algorithm involves reading the pixels of the area of the image for which the cluster is responsible and searching for contour points. With each contour point found, the cluster computes the portion of the parameter space which will be modified by this point. In the case of the straight line search, it is known that a point of the starting image becomes a straight line within the framework of its Hough transform. The parameters of this straight line can be used to ascertain the portion to be modified in the Hough space. The cluster must therefore find the clusters in charge of the area to be modified. Once this identification has been performed, a DMA task is activated to dispatch to the clusters concerned a request to update the area of the parameter space with the parameters of the straight line. Potentially, each cluster can dispatch data to all the other clusters, but the computation of the actual recipients is carried out during the processing.

A second part of the algorithm involves receiving the requests for updates, which may potentially originate from all the clusters. For each request, the cluster must recover in central memory the portion of the parameter space to be updated before performing the update and then rewriting the new parameter space to central memory. A certain number of optimizations are possible at this level, notably it is possible to retain in local memory a part of the parameter space that can serve for the following requests. This part of the algorithm can take two forms depending on the capabilities of the interface with the DRAM controller. According to a first implementation, the area of interest can be recovered and all the pixels of the area are then modified. According to a second implementation, a larger area can be recovered, optionally the whole of the area for which the cluster is responsible, and the pixels can then be updated according to whether they do or do not belong to the parameter straight line. To be efficient, the second implementation must await the accumulation of a certain number of requests so as to mask the recovery of a larger area of interest. To summarize, it is possible either to effect a complex communication coupled with a simple update processing, by recovering a fine area of interest, or to have a more complex processing with a simplified communication.

It is clearly apparent that the parallelization of the Hough algorithm is strongly coupled with the communication capabilities of the system. The mechanisms already illustrated in the two previous applications, such as quota management or task synchronization, remain valid for the Hough transform. However, a certain number of discriminating elements exist in relation to the two previous applications of morphing and MPEG-2 decoding. First discriminating element, the recipients of certain communications are computed during processing. If the recipient of a communication has to be computed during execution, the DMA program must be able to acquire the parameters allowing it to tailor its processing. As was already stated previously, the DMA executes a program and the DMA task is managed by the same mechanisms as a task of a PE. Thus the DMA task has a condition of precedence over the parameters, in the present case this is the recipient. Once the parameters are known, the DMA program can therefore read them in memory and tailor the communication. This mechanism also supports the data flow mode mentioned previously. Thus, if the recipients change during execution, the DMA program reads them successively in the memory. In the case where these parameters are not yet available, the task is placed on standby and is managed by the task controller. It should also be noted that it is possible that the consumer may need to identify the cluster which dispatches the data item to it, so as to be able to tailor the reception processing. This can be carried out either directly inside the DMA block, or on passing through the resource manager.

Second discriminating element, the recovery of data contained in central memory can be parametrized during processing. This is in fact the same case as that mentioned in the "morphing" application for the "prefetch" of the predicted image blocks. The main difference with a programmed transfer to another cluster is that the parameter is generalized. Moreover, the interface with the central memory can take various forms with variable capabilities. Thus, it is possible to propose a "cluster of access to the central memory", the manner of operation of which is based on a similar principle to the remainder of the system, in particular the manner of operation of the clusters. It also employs a manager and local memory. A request of an area of interest in central memory can then begin with the dispatching of the parameters by a cluster. The availability of these parameters activates a DMA task which then carries out the transfer to the central memory. It is even possible to go further and to furnish the central memory cluster with a unit allowing the management of the rights of portion of the memory space and thus to have a totally homogeneous view at the level of the execution model. However, if this type of access by area of interest is predominant in a given application field, it is also possible to specialize the structure to include this mode in the DMA of the central memory.

Third discriminating element, the clusters are ignorant of the amount of data that they have to process, since the update requests are directed by the data, related to the presence or otherwise of contour points. If no mechanism is envisaged, the task may place itself on standby awaiting data although the producer has finished its work and is no longer providing data. It is therefore necessary for the producer to be able to signal to the consumer that it has finished the task so that the consumer does not get locked in a standby state. This can be carried out in various ways. By way of example, the writing of a particular data item or the dispatching of an event from the producer to the consumer can be envisaged.

The Hough transform can therefore be efficiently parallelized on the execution model according to the invention, notably by virtue of the communication devices which have dynamic support during execution. It is possible to achieve a compromise between the complexity of the processing operations and communications, so as to properly distribute the workloads and to optimize the application.

A fundamental advantage of the present invention is that the model that it proposes supports both task parallelism and the data flow mode while maintaining high determinism of execution. The implementation of the various functionalities required to support this execution paradigm can take various forms, of which only a few possible routes demonstrating its feasibility have been described in the present patent application. Notably, the nature of the network and of the processing or communication elements do not call into question the model according to the invention, but renders it more or less relevant and efficient. Another advantage of the present invention is that the dynamics within a cluster or communications makes it possible to efficiently implement intensive-computation applications comprising complex checks. The overlap between the processing operations and the communications permit intensive "prefetch" policies making it possible to limit the bottlenecks that data access generally constitutes.

The invention claimed is:

1. A system for executing a given application by executing tasks in parallel, the system comprising:
a plurality of processing units, the processing units being organized into a plurality of clusters of units, each cluster comprising a local memory, each local memory comprising one or more memory blocks;
means for statically allocating a set of tasks of said application to one of said clusters of units, so that said set of tasks is processed by the same cluster of units from one execution to another execution of said application;
wherein each cluster of units further comprises a cluster manager for dynamically allocating each task of a set of tasks allocated to the cluster to a processing unit in said cluster and memory blocks in the local memory for executing said task, so that said set of tasks allocated to the cluster may be processed by a different processing unit from one execution to another execution of said application, the cluster manager including:
a task manager for managing the execution of tasks on the processing units of the cluster; and
a memory manager for managing the allocation of data comprised in one or more memory blocks in said local memory to a set of tasks allocated to the cluster,
said task manager and said memory manager operating simultaneously and cooperatively;
wherein when a task allocated to a cluster of units has to consume data produced in another cluster of units, a data sending task is executed in the cluster where the data are produced, said data sending task transmitting the data to a data receiving task executed in the cluster where the data are consumed, and a memory space dedicated to communication between the data sending task and the data receiving task is reserved in the local memory of one of the two clusters involved.

2. The system as claimed in claim 1, wherein the local memory that each cluster comprises is dedicated to said cluster.

3. The system as claimed in claim 1, wherein the clusters of units are disposed on a chip, the clusters of units communicating with one another by way of a network on chip.

4. The system as claimed in claim 1, further comprising a central memory.

5. The system as claimed in claim 1, further comprising means for compiling and editing links for statically allocating tasks to each cluster of units.

6. The system as claimed in claim 1, wherein the data sending task is temporarily interruptible so as not to saturate the memory space dedicated to the communication between the data sending task and the data receiving task.

7. The system as claimed in claim 1, wherein the system is configured to determine throughput of the data sending task during compilation and to allocate to the data receiving task space in the local memory as a function of said throughput.

8. The system as claimed in claim 1, wherein the data sending task is allocated statically to the cluster where the data is produced and the data receiving task is allocated statically to the cluster where the data is consumed.

9. The system as claimed in claim 1, wherein the data sending task and the data receiving task are executed by dedicated execution means configured to exchange data directly with the local memory of each cluster.

10. The system as claimed in claim 7, wherein the cluster where the data is consumed is configured to dispatch a credit to the cluster producing the data as a function of an available amount in said memory space dedicated to the communication, the cluster producing the data being configured to adjust the throughput of the data sending task as a function of the credit received from the cluster where the data is consumed.

11. The system as claimed in claim 1, wherein, when the memory space dedicated to the communication between the data sending task and the data receiving task is used beyond a given quota, the cluster manager for the cluster executing the data receiving task is configured to dispatch an interrupt signal to the cluster manager for the cluster executing the data sending task, and to dispatch a resume signal when the memory space is used below the quota.

12. The system as claimed in claim 1, wherein the allocated memory blocks of the local memory have a fixed size.

13. The system as claimed in claim 1, wherein allocated memory blocks of the local memory have a variable size and a defragmentation function is used for maintaining continuity of an addressing space formed by the local memory.

14. The system as claimed in claim 1, wherein the task manager of each cluster comprises:
   a module for selecting tasks in said set of tasks fulfilling execution prerequisites, which provide allocatable tasks;
   a scheduling module for mapping said each allocatable task to an available processing unit of said clusters according to a scheduling policy.

15. The system as claimed in claim 14, wherein the module for selecting tasks determines the allocatable tasks fulfilling execution prerequisites at one and the same time in a mode of execution of parallel multitask type and in a mode of execution of data flow type.

16. The system as claimed in claim 14, wherein the execution prerequisites comprise precedencies of processing operations or availabilities of data or availabilities of memory spaces for storing the data produced or events that are local or external to the cluster.

17. The system as claimed in claim 1, wherein the data sending task allows to transmit data to several clusters of units simultaneously, so as to simultaneously supply several consuming tasks with the same data.

18. The system as claimed in claim 1, wherein several data sending tasks are executable simultaneously in one and the same cluster of units, so as to simultaneously supply several consuming tasks with different data.

19. The system as claimed in claim 1, further comprising a manager for managing data sending tasks and the data receiving tasks of DMA type, so as not to overload the task managers.

20. The system as claimed in claim 1, further comprising at least one input/output interface.

21. The system as claimed in claim 1, wherein the system allows execution of a morphing application by executing tasks in parallel on its processing units.

22. The system as claimed in claim 1, wherein the system allows execution of an application implementing a Hough transform by executing tasks in parallel on its processing units.

23. The system as claimed in claim 1, wherein the system allows execution of an MPEG decoding application by executing tasks in pipeline mode.

24. The system as claimed in claim 1, wherein the memory blocks in the local memory are freed by using a counter for counting a number of tasks that have consumed data of these memory blocks.

25. The system as claimed in claim 1, wherein the memory blocks in the local memory are freed by using a list of the tasks that have consumed data of these memory blocks.

* * * * *